US006895825B1

(12) United States Patent
Barkhoudarian

(10) Patent No.: US 6,895,825 B1
(45) Date of Patent: May 24, 2005

(54) ULTRASONIC TRANSDUCER ASSEMBLY FOR MONITORING A FLUID FLOWING THROUGH A DUCT

(75) Inventor: Sarkis Barkhoudarian, West Hills, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/707,969

(22) Filed: Jan. 29, 2004

(51) Int. Cl.$^7$ ................................................ G01F 1/66
(52) U.S. Cl. .................................................. 73/861.28
(58) Field of Search ........................ 73/861.27, 861.28, 73/861.29, 861.31

(56) References Cited

U.S. PATENT DOCUMENTS

| | | | | |
|---|---|---|---|---|
| 5,637,800 A | * | 6/1997 | Finsterwald et al. | 73/642 |
| 6,490,228 B2 | * | 12/2002 | Killam | 367/140 |
| 6,776,051 B2 | * | 8/2004 | Suzuki et al. | 73/861.27 |

* cited by examiner

Primary Examiner—Edward Lefkowitz
Assistant Examiner—Corey D. Mack
(74) Attorney, Agent, or Firm—Artz & Artz, PC

(57) ABSTRACT

An ultrasonic transducer assembly for helping monitor a fluid flowing through a duct is disclosed herein. The assembly includes: (1) a piezoelectric transducer element having a first contact surface electroplated with a first metallic film layer and an opposite second contact surface electroplated with a second metallic film layer; (2) a housing, configured on and at least partially conterminous with the outer surface of the duct, having a chamber in which the piezoelectric transducer element is situated and thereby substantially enclosed; and (3) means for conducting electrical signals between the electroplated first contact surface of the piezoelectric transducer element and the outside of the housing. In the assembly, the electroplated second contact surface of the piezoelectric transducer element is solder-mounted within the housing such that the piezoelectric transducer element is thereby coupled to the outer surface of the duct in a substantially conterminous fashion.

29 Claims, 15 Drawing Sheets

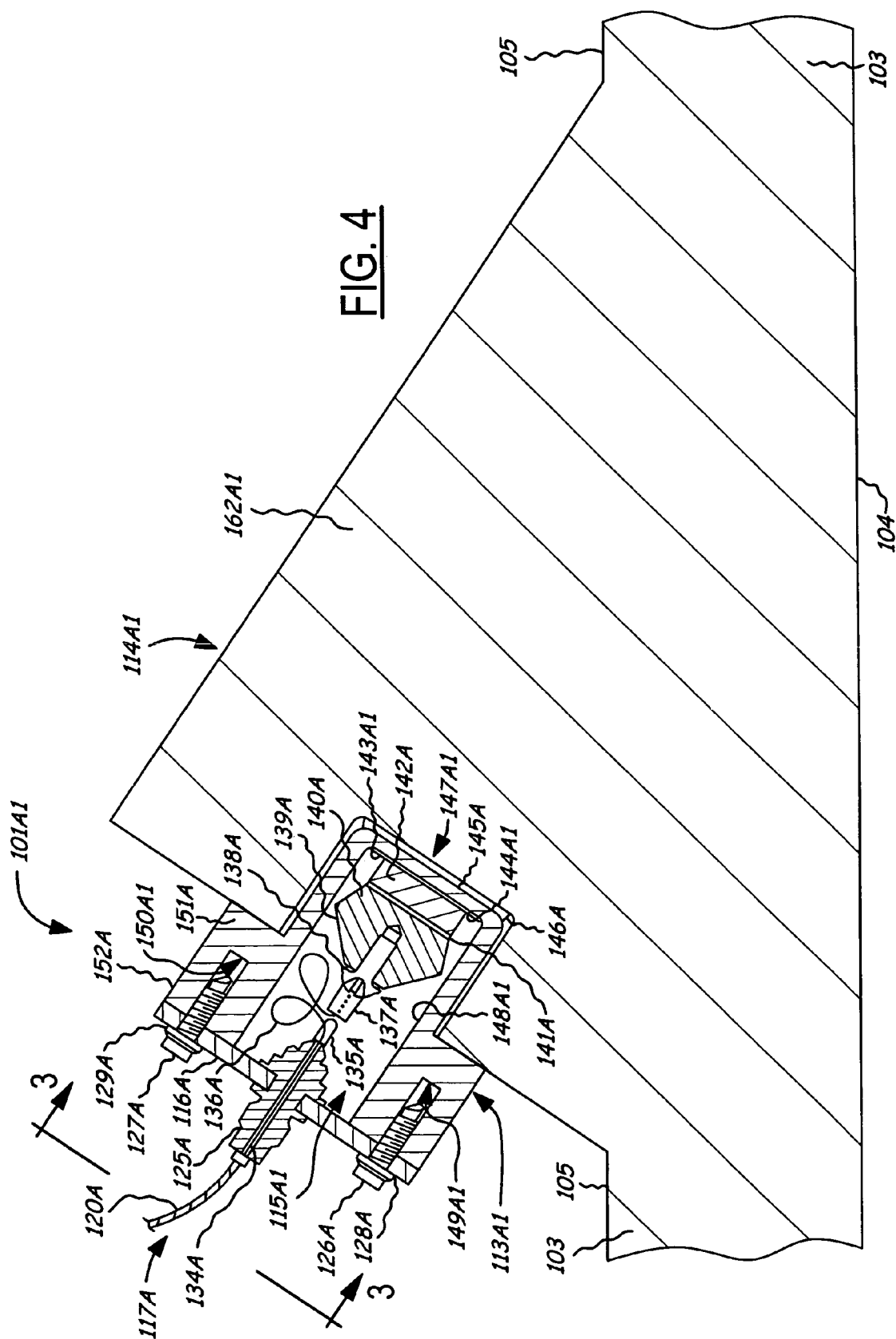

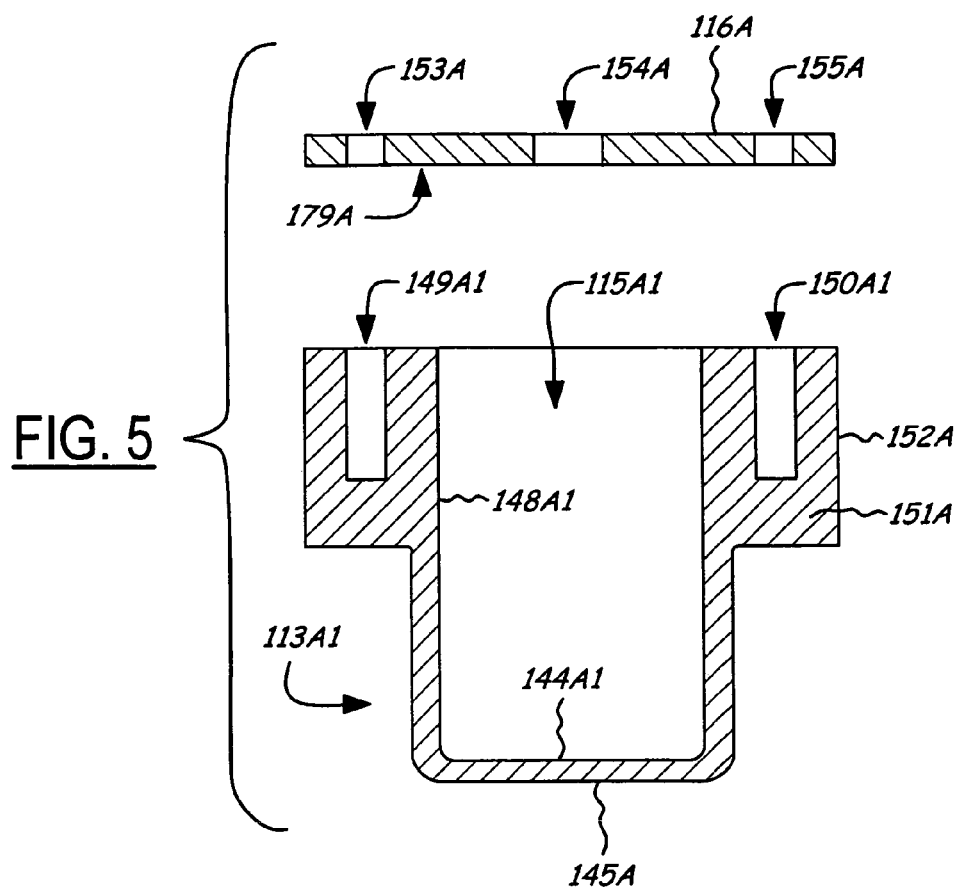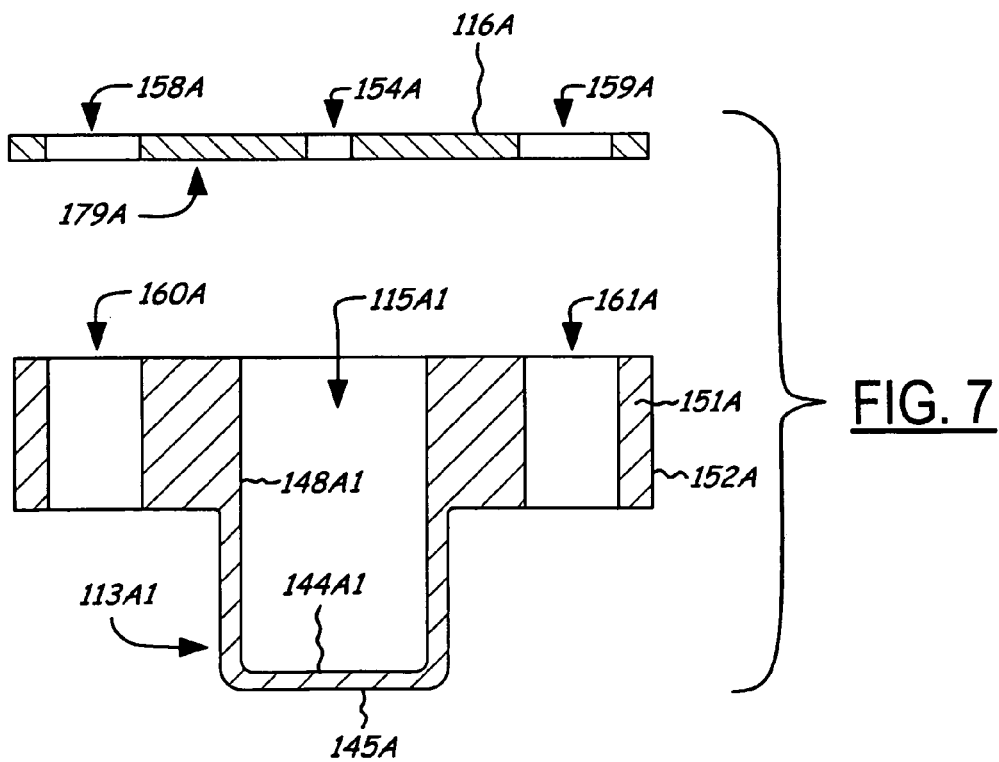

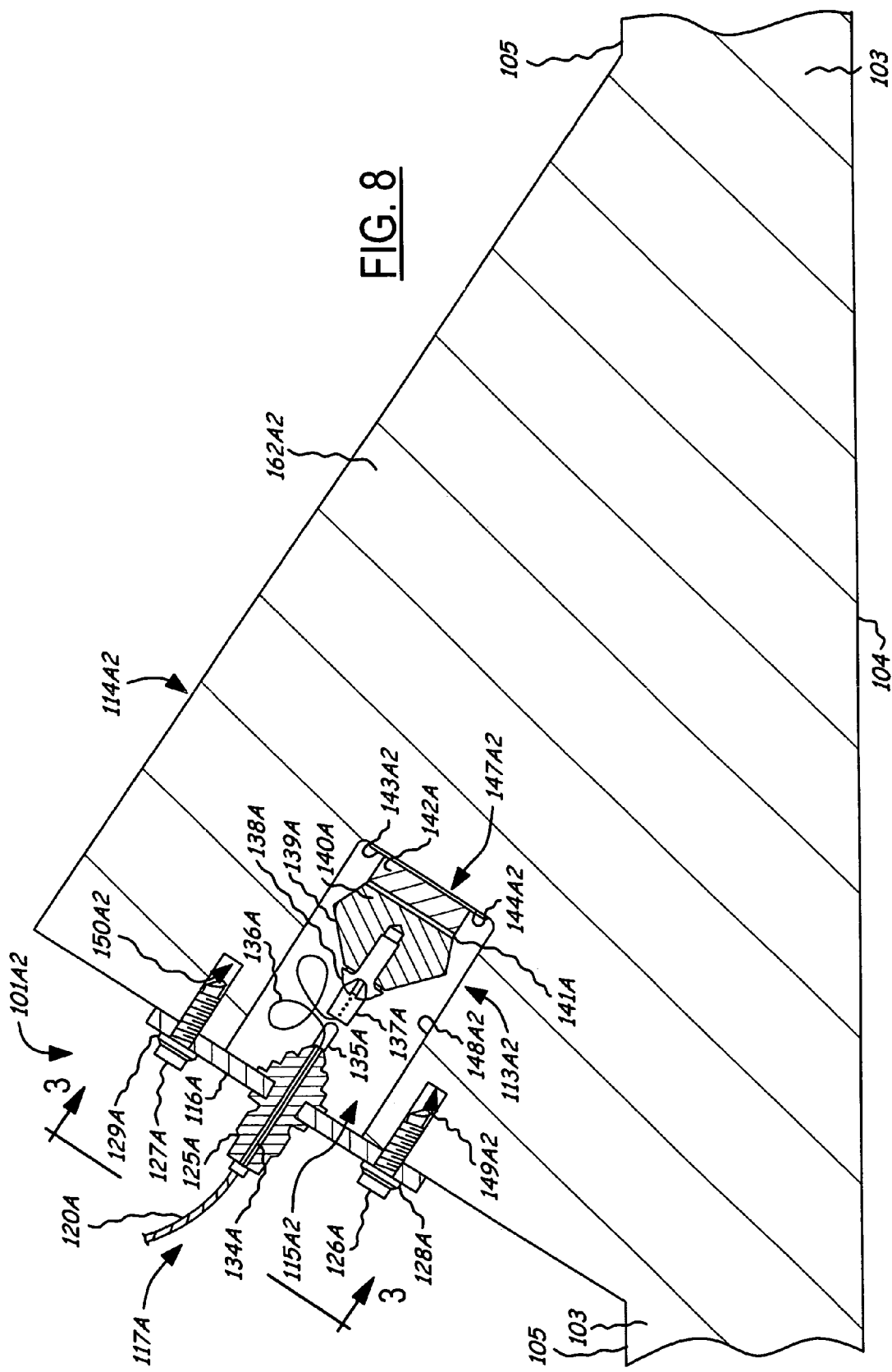

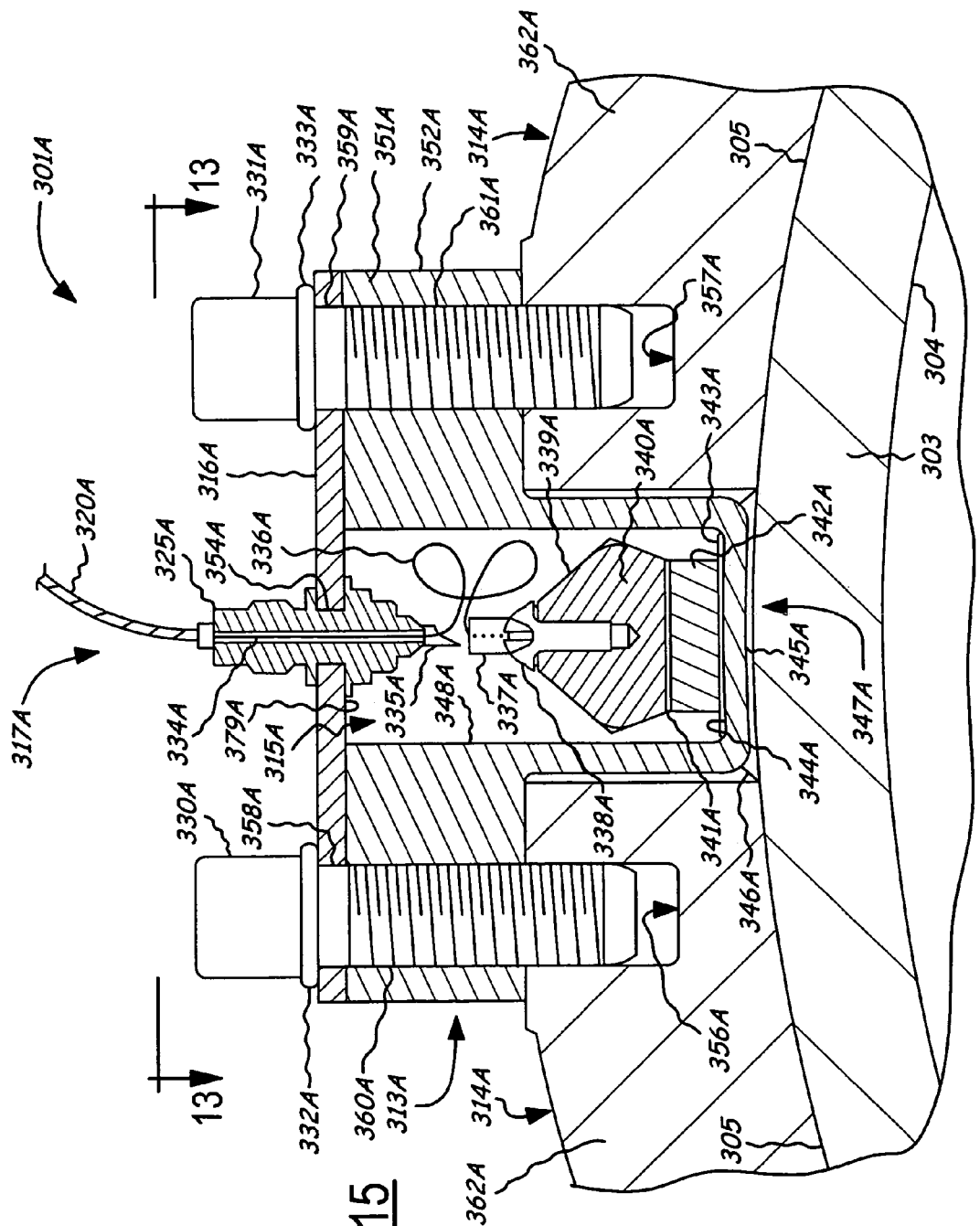

US 6,895,825 B1

ULTRASONIC TRANSDUCER ASSEMBLY FOR MONITORING A FLUID FLOWING THROUGH A DUCT

BACKGROUND OF INVENTION

The present invention generally relates to transducers that are used to help monitor a fluid flowing through, for example, a canal, conduit, duct, pipe, tube, or the like. The present invention more particularly relates to ultrasonic transducers that are used to help monitor, in a non-intrusive manner, the flow rate or temperature of a fluid flowing through a duct.

To propel a rocket into the upper atmosphere and outer space, a propellant is provided to a thrusting engine situated onboard the rocket. In most liquid-propellant type rocket engines, the propellant primarily includes a mixture of both fuel and an oxidizer. Typically, the fuel is gasoline, kerosene, alcohol, or liquid hydrogen. The oxidizer, on the other hand, is typically a cold liquefied gas such as liquid oxygen. In general, the fuel and oxidizer are individually pumped from separate tanks, conveyed along separate pipes or ducts, and ultimately delivered into a common combustion chamber associated with the thrusting engine. Once within the combustion chamber, the fuel and oxidizer together serve as a propellant mixture which is ignited and burned, thereby creating both a high-pressure and high-velocity stream of hot gases. This stream of hot gases is directed through a nozzle wherein the stream is further accelerated until the gases leave the engine area and are ultimately expelled from the thrusting end of the rocket. By expelling the stream of gases in this manner, the rocket itself is thereby thrust into the upper atmosphere and outer space in a direction generally opposite its thrusting end.

To attain a proper level of thrust, the individual amounts of fuel and oxidizer delivered to the combustion chamber of a thrusting engine are closely regulated and monitored. In doing so, an optimum fuel-to-oxidizer propellant mixture ratio for a desired level of thrust is thereby achieved. In the case wherein the oxidizer is liquid oxygen, the actual flow rate of the liquid oxygen passing through its respective duct is both sensed and monitored to thereby provide feedback control on the amount of liquid oxygen that is actively being pumped and ultimately delivered to the combustion chamber. In this way, efficient propellant consumption by a thrusting engine is realized via real time control. As a result, inadvertent delivery of the rocket and its payload into a lower-than-anticipated orbit, for example, is largely prevented.

Traditionally, in-flow turbine flowmeters have been utilized for helping monitor the flow rate of liquid oxygen being delivered into a combustion chamber. In general, such in-flow turbine flowmeters are situated within the liquid oxygen delivery duct itself wherein the flowmeters physically encounter and interact with the flow of liquid oxygen passing therethrough. By interacting with the flow of liquid oxygen in this manner, the turbine flowmeters are thereby able to generate electrical feedback control signals that are representative of the real time flow velocity of the liquid oxygen passing through the duct. Although such in-flow turbine flowmeters are generally effective in helping monitor the flow rate of liquid oxygen, there are certain disadvantages in utilizing such flowmeters. First, given that eddies and turbulence within a moving fluid tend to skew overall flow velocity, installing one or more of such in-flow turbine flowmeters within a duct pursuant to a positioning scheme that attempts to accurately detect fluid flow velocity is oftentimes challenging and difficult. Second, if an in-flow turbine flowmeter experiences structural problems or damage while situated in a duct, such can sometimes render a thrusting engine altogether unusable. Third, such in-flow turbine flowmeters are relatively bulky both in terms of size and mass, thereby undesirably reducing the payload carrying capacity of a rocket. Fourth, the flow-intrusive or flow-invasive nature of such in-flow turbine flowmeters sometimes gives rise to a small parasitic pressure drop within a duct that can somewhat reduce the operating efficiency of a thrusting engine.

In recent years, ultrasonic transducer flowmeters have gained popularity due to their non-intrusive manner of operation. In a most common and basic form, an ultrasonic transducer flowmeter generally includes two lightweight piezoelectric ceramic wafers that are both mounted on and coupled to the outer surface of a duct. The two wafers are generally mounted on opposite sides of the duct such that they are slightly offset from each other along the length of the duct. In this way, one wafer is situated upstream and the other wafer is situated downstream along the length of the duct. Mounted as such, the two wafers are also electrically connected via separate wires to a common electric control circuit that is capable of transmitting and receiving electrical signals to and from the two wafers. In such a configuration, the control circuit initially transmits, for example, an electrical signal along a wire to the upstream wafer. Upon receiving the electrical signal, the upstream wafer immediately converts the electrical signal into an ultrasonic acoustic signal and directionally transmits the acoustic signal through the duct and toward the downstream wafer. Upon receiving the acoustic signal, the downstream wafer immediately converts the acoustic signal into an electrical signal which is then conducted along a wire and received by the control circuit. Upon receiving the electrical signal, the control circuit then calculates the downstream transit time of the acoustic signal through the duct based on the elapsed time between the initial transmission of an electrical signal to the upstream wafer and the later receipt of an electrical signal from the downstream wafer. Thereafter, the control circuit then transmits an electrical signal along a wire to the downstream wafer. Upon receiving the electrical signal, the downstream wafer immediately converts the electrical signal into an ultrasonic acoustic signal and directionally transmits the acoustic signal through the duct and toward the upstream wafer. Upon receiving the acoustic signal, the upstream wafer immediately converts the acoustic signal into an electrical signal which is then conducted along a wire and received by the control circuit. Upon receiving the electrical signal, the control circuit then calculates the upstream transit time of the acoustic signal through the duct based on the elapsed time between the initial transmission of an electrical signal to the downstream wafer and the later receipt of an electrical signal from the upstream wafer. After both the downstream and upstream transit times have been calculated in this manner, the control circuit then compares the two transit times and calculates their difference. Given that an acoustic signal's transit time through a given fluid is generally directly affected by the fluid's flow velocity, the transit time difference, once calculated, is then used by the control circuit to substantially determine the real time velocity of the fluid passing through the duct. After determining the fluid velocity, known dimensions of the duct such as its inner diameter and associated cross-sectional area can then be utilized to determine a fluid flow rate by multiplying the velocity of the fluid by the cross-sectional area of the duct. Once the flow rate is determined, the volume and amount of fluid actually being delivered via the duct during a period of time can then generally be determined and thereafter adjusted as necessary.

In mounting the two piezoelectric ceramic wafers of an ultrasonic transducer flowmeter on a duct, the wafers must both be intimately attached or coupled to the duct so that there generally is no air gap or separation between the wafers and the outer surface of the duct. The reason for such is because any air gap, separation, or delamination between a wafer and the outer surface of the duct tends to reflect and unduly interfere with any ultrasonic acoustic signals being directed and transmitted between the two wafers. Hence, if separation between even one of the two wafers and the outer surface of a duct is significant enough, proper transmission and receipt of acoustic signals between the two wafers will no longer be possible. Consequently, the electric control circuit will not be able to accurately determine the flow rate of the fluid passing through the duct.

When fluid flow through a duct occurs in an operating environment wherein noncryogenic temperatures are involved, certain gels, epoxies, and greases can effectively be utilized to help intimately mount and couple the piezoelectric ceramic wafers of an ultrasonic transducer flowmeter to the outer surface of the duct. In, however, an operating environment onboard a liquid-propellant type rocket wherein cryogenic liquids are commonly circulated about the super-hot combustion chamber and nozzle for cooling and other purposes, wafer-coupling media such as gels, epoxies, and greases are generally not very effective. In particular, if a gel, epoxy, or grease medium is used, for example, to couple a wafer to a duct in which liquid oxygen in its cold liquefied form is being conveyed, the medium will typically freeze since liquid oxygen temperatures commonly extend below 300° F. Such freezing in conjunction with the extreme and violent vibration caused by an operating thrusting engine typically causes micro-cracking, fracture, and delamination in the medium. Consequently, the wafer is thereby separated, to some degree, from the outer surface of the duct, thereby rendering the liquid oxygen flow rate potentially undeterminable.

Due to the above-intimated heretofore lack in flowmeters that are characteristically both non-intrusive and robust in nature, the flow rate of liquid oxygen passing through a duct onboard a liquid-propellant type rocket is generally not directly determined according to current practice. Instead, engineers have alternatively had to resort to more indirect and less accurate methods in determining the flow rate of liquid oxygen onboard a liquid-propellant type rocket. Having to settle for such indirect methods, however, is generally undesirable, for such methods tend to facilitate less than optimum thrusting engine performance and also briefly mask the need for thrusting engine maintenance. With regard to thrusting engine performance, direct and accurate real time determinations of liquid oxygen flow rates are highly preferred for feedback control purposes so that timely delivery of propellant constituents into the combustion chamber can be precisely regulated. In this way, propellant mixture ratios within the combustion chamber can be timely tweaked to thereby facilitate efficient propellant consumption and optimum thrusting engine performance. With regard to thrusting engine maintenance, direct and accurate real time determinations of liquid oxygen flow rates are also highly preferred for making close comparisons to predicted flow rate values derived from a predetermined ideal engine operation model. In this way, any significant deviations of such accurately determined real time flow rates from predicted engine model flow rates may be considered more seriously. As a result, one or more various causes for anomalous engine operation can be detected, isolated, and addressed in an early and timely fashion. Such early detection is highly desirable, for such helps reduce repair and maintenance costs when progressive type problems arise. In addition, such early detection is also highly desirable since such helps improve overall safety.

In light of the above, there is generally a present need in the art for flowmeters that are characteristically both non-intrusive with respect to fluid flow and robust in various extreme operating environments. More particularly, there is a present need in the art for ultrasonic transducer flowmeters that are largely able to both endure cryogenic temperatures and withstand extreme vibration onboard a rocket without experiencing delamination from a duct conveying, for example, liquid oxygen.

SUMMARY OF INVENTION

The present invention provides an ultrasonic transducer assembly for helping monitor a fluid flowing through a duct. In one practicable embodiment, the ultrasonic transducer assembly basically includes a piezoelectric transducer element, a housing, and an electrical signals conducting means. The piezoelectric transducer element, first of all, has both a first contact surface and an opposite second contact surface. The first contact surface is electroplated with a first metallic film layer, and the second contact surface is electroplated with a second metallic film layer. The housing, in turn, is both configured on and at least partially conterminous with the outer surface of the duct. The housing itself has a chamber in which the piezoelectric transducer element is situated and thereby substantially enclosed. The electrical signals conducting means, last of all, serves to conduct electrical signals between the electroplated first contact surface of the piezoelectric transducer element and the outside of the housing. In such an ultrasonic transducer assembly, the electroplated second contact surface of the piezoelectric transducer element is solder-mounted within the housing such that the piezoelectric transducer element is thereby coupled to the outer surface of the duct in a substantially conterminous fashion.

In addition, the present invention also provides a process for fabricating such an ultrasonic transducer assembly. In one practicable methodology, the fabrication process basically includes, first of all, the steps of (1) electroplating a first metallic film layer on a first contact surface of a piezoelectric transducer element and electroplating a second metallic film layer on an opposite second contact surface of the piezoelectric transducer element, and (2) situating the piezoelectric transducer element in a chamber within a housing. In addition, the fabrication process also basically includes the steps of (3) solder-mounting the electroplated second contact surface of the piezoelectric transducer element within the housing such that the piezoelectric transducer element is thereby coupled to the housing in a substantially conterminous fashion, and (4) installing a means for conducting electrical signals between the electroplated first contact surface of the piezoelectric transducer element and the outside of the housing. Lastly, the fabrication process also basically includes the steps of (5) closing the housing such that the piezoelectric transducer element is thereby substantially enclosed within the chamber of the housing, and (6) configuring the housing on the outer surface of the duct such that the housing is at least partially conterminous with the outer surface of the duct and such that the piezoelectric transducer element is thereby coupled to the outer surface of the duct in a substantially conterminous fashion.

In a preferred embodiment or methodology pursuant to the present invention, the piezoelectric transducer element itself is a ceramic crystal wafer having a Curie temperature inherently associated therewith. The first and second metallic film layers electroplated on the first and second contact surfaces of the piezoelectric transducer element, in turn, preferably include gold, indium, silver, or some other soft, ductile, or malleable metal. Given such a material composition, the piezoelectric transducer element, via its electroplated second contact surface, is preferably solder-mounted both to the housing and within the housing's chamber by a low-temperature oven reflow process during which the piezoelectric transducer element and the housing are artificially pressed together. By employing a low-temperature oven reflow process, a soldering environment with a uniform thermal gradient and a carefully controlled soldering temperature is thereby realized. In this way, the soldering temperature can be closely monitored so as to not exceed the Curie temperature of the piezoelectric transducer element and thereby inadvertently neutralize its piezoelectric properties. Furthermore, to better facilitate the solder-bonding effectiveness of such a low-temperature oven reflow process, a low-temperature type solder such as, for example, an indium alloy type solder is preferably employed as well.

In implementing such a preferred embodiment or methodology pursuant to the present invention, the piezoelectric transducer element is thereby coupled to the outer surface of the duct in a substantially conterminous fashion such that any element-to-housing or housing-to-duct coupling medium or solder joint is particularly able to largely endure cryogenic temperatures and withstand extreme vibration without experiencing significant micro-cracking, fracture, or delamination. As a result, ultrasonic acoustic signals transmitted or received by the piezoelectric transducer element within the overall ultrasonic transducer assembly are therefore not unduly interfered with, even under such cryogenic temperature and extreme vibration conditions. Hence, an ultrasonic transducer assembly in a preferred embodiment, or fabricated according to a preferred methodology, pursuant to the present invention can therefore be effectively utilized in, for example, liquid-propellant type rocket engine propulsion applications.

Furthermore, it is believed that various alternative embodiments, methodologies, design considerations, applications, and advantages of the present invention will become apparent to those skilled in the art when the detailed descriptions of the best modes contemplated for practicing the present invention, as set forth hereinbelow, are reviewed in conjunction with the appended claims and the accompanying drawing figures.

BRIEF DESCRIPTION OF DRAWINGS

Hereinbelow, the present invention is described in detail, by way of example, with reference to drawings included in accompanying FIGS. 1 through 17. In all FIGS. 1 through 17, the same or similar reference numerals are generally used to identify the same or similar features. A brief description of the pictorial content included within each of FIGS. 1 through 17 is set forth as follows.

FIG. 4 is a close-up sectional view of the top ultrasonic transducer assembly shown in FIG. 2. In this view, the housing associated with the top ultrasonic transducer assembly is shown to have an internal chamber wherein a piezoelectric transducer element is situated and thereby substantially enclosed.

FIG. 5 is an exploded sectional view of the housing enclosure associated with the top ultrasonic transducer assembly shown in FIG. 2. In this view, as compared to FIG. 4, the housing enclosure is sans the piezoelectric transducer element to thereby highlight its internal chamber. Also, in this view, the housing is shown to include a removable cover plate.

FIG. 7 is also an exploded sectional view of the housing enclosure associated with the top ultrasonic transducer assembly shown in FIG. 2. In this view, the housing enclosure is alternatively shown from a vantage generally rotated 90 degrees from the vantage of FIG. 5.

FIG. 8 is a close-up sectional view of a structural variation of the top ultrasonic transducer assembly shown in FIGS. 2 and 3. In this view, as compared to FIG. 4, the housing associated with the top ultrasonic transducer assembly is alternatively shown to be largely integral with both the outer surface and wall of the duct.

FIG. 15 is a close-up sectional view of the top ultrasonic transducer assembly shown in FIG. 12. In this view, the housing associated with the top ultrasonic transducer assembly is alternatively shown, as indicated in FIG. 13, from a vantage generally rotated 90 degrees from the vantage of FIG. 14.

DETAILED DESCRIPTION

Figure 1:
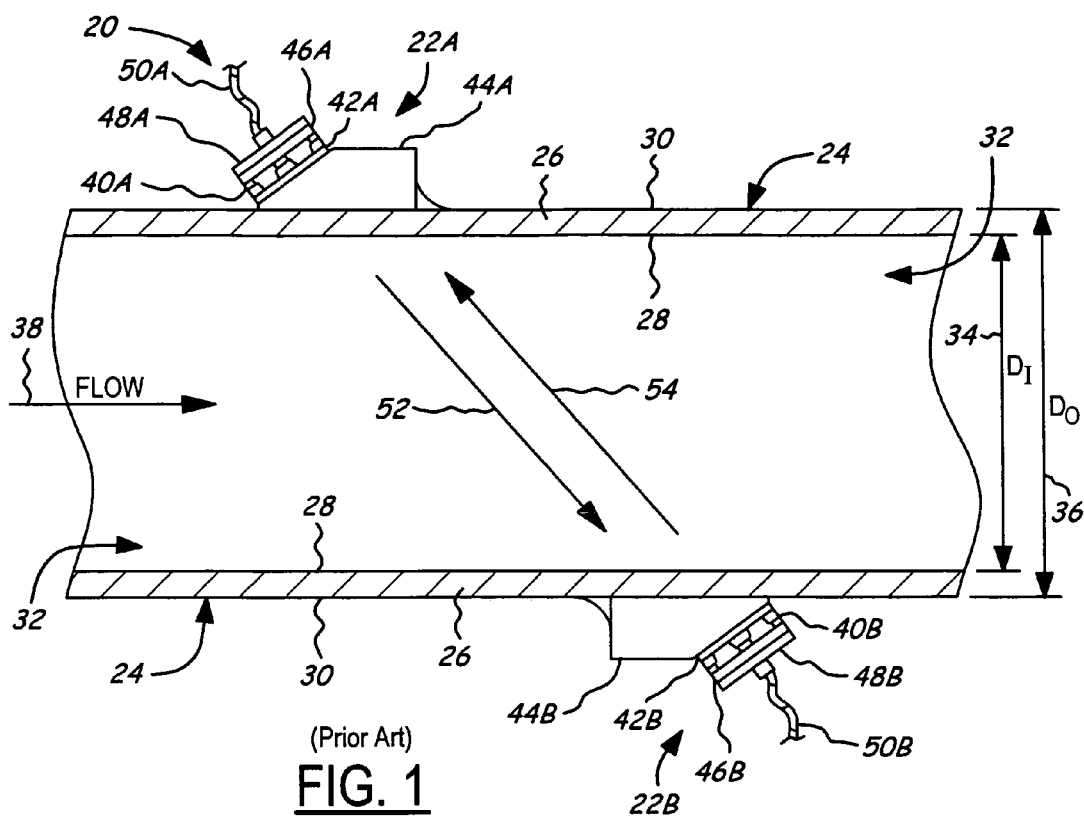
FIG. 1 is a partially sectional view of two ultrasonic transducer assemblies that are prevalent in the known prior art. In this view, the two ultrasonic transducer assemblies are mounted on the top and bottom of a common duct in an offset fashion to thereby help monitor the flow rate of a fluid flowing therethrough.

In FIG. 1, a partially sectional view of an ultrasonic transducer flowmeter system 20 that is prevalent in the known prior art is illustrated for purposes of comparison herein. As illustrated, the ultrasonic transducer flowmeter system 20 basically includes two ultrasonic transducer assemblies 22A and 22B that are mounted on a common duct 24. The duct 24 itself, commonly made of metal, is substantially cylindrical and includes a wall 26 having both an inner surface 28 and an outer surface 30. The inner surface 28, first of all, delimits an inner diameter ($D_I$) 34 for the duct 24. In doing so, the inner surface 28 thereby defines a hollow 32 within the duct 24 through which liquid oxygen, for example, is permitted to flow in a direction 38. The outer surface 30, on the other hand, delimits an outer diameter ($D_O$) 36 for the duct 24. As illustrated, the two ultrasonic transducer assemblies 22A and 22B are particularly mounted on the outer surface 30 of the duct 24 such that they are on opposite sides of the duct 24 and are slightly offset from each other along the length of the duct 24. In this configuration, the ultrasonic transducer assembly 22A is situated upstream and the ultrasonic transducer assembly 22B is situated downstream relative to the direction of flow 38 of liquid oxygen passing through the duct 24.

The two ultrasonic transducer assemblies 22A and 22B have structures that are generally identical to each other. The upstream ultrasonic transducer assembly 22A, for example, basically includes a piezoelectric ceramic wafer 40A having both a first contact surface and an opposite second contact surface. The first contact surface of the piezoelectric ceramic wafer 40A has an electrically conductive electrode 48A fixedly attached thereto via a first interface layer 46A. The first interface layer 46A itself is electrically conductive as well and may include, for example, a metallic film and a solder joint. The electrode 48A, in turn, is electrically connected to an electrically conductive wire or cable 50A. The cable 50A serves to conduct electrical signals between the first contact surface of the piezoelectric ceramic wafer 40A and an electric control circuit (not shown).

The second contact surface of the piezoelectric ceramic wafer 40A, on the other hand, is fixedly attached to a wallmount structure 44A via a second interface layer 42A. The second interface layer 42A itself may include, for example, a gel, an epoxy, or a grease medium for intimately coupling the second contact surface of the piezoelectric ceramic wafer 40A to the wallmount structure 44A. The wallmount structure 44A, in turn, is mounted on the outer surface 30 of the duct 24. In such a configuration, the wallmount structure 44A serves to both mount and indirectly couple the second contact surface of the piezoelectric ceramic wafer 40A to the duct 24. In addition, the wallmount structure 44A also serves to orient the second contact surface of the piezoelectric ceramic wafer 40A so that it generally faces the second contact surface of the piezoelectric ceramic wafer 40B included within the downstream ultrasonic transducer assembly 22B.

During operation of the ultrasonic transducer flowmeter system 20, the aforementioned electric control circuit initially transmits an electrical signal along the cable 50A to the piezoelectric ceramic wafer 40A of the upstream ultrasonic transducer assembly 22A. Upon receiving the electrical signal, the upstream wafer 40A immediately converts the electrical signal into an ultrasonic acoustic signal and transmits the acoustic signal in a direction 52, through the duct 24, and toward the piezoelectric ceramic wafer 40B of the downstream ultrasonic transducer assembly 22B. Upon receiving the acoustic signal, the downstream wafer 40B immediately converts the acoustic signal into an electrical signal which is then conducted along a cable 50B and received by the control circuit. Upon receiving the electrical signal, the control circuit then calculates the downstream transit time of the acoustic signal through the duct 24 based on the elapsed time between the initial transmission of an electrical signal to the upstream wafer 40A and the later receipt of an electrical signal from the downstream wafer 40B. Thereafter, the control circuit then transmits an electrical signal along the cable 50B to the downstream wafer 40B. Upon receiving the electrical signal, the downstream wafer 40B immediately converts the electrical signal into an ultrasonic acoustic signal and transmits the acoustic signal in a direction 54, through the duct 24, and toward the upstream wafer 40A. Upon receiving the acoustic signal, the upstream wafer 40A immediately converts the acoustic signal into an electrical signal which is then conducted along the cable 50A and received by the control circuit. Upon receiving the electrical signal, the control circuit then calculates the upstream transit time of the acoustic signal through the duct 24 based on the elapsed time between the initial transmission of an electrical signal to the downstream wafer 40B and the later receipt of an electrical signal from the upstream wafer 40A. After both the downstream and upstream transit times have been calculated in this manner, the control circuit then compares the two transit times and calculates their difference. Once calculated, the transit time difference is then used by the control circuit to substantially determine the real time velocity of the liquid oxygen passing through the duct 24. After determining the velocity, known dimensions of the duct 24 such as its inner diameter ($D_I$) 34 and associated cross-sectional area are then utilized to determine a flow rate by multiplying the velocity of the liquid oxygen by the cross-sectional area of the duct 24. Once the flow rate is determined, the volume and amount of liquid oxygen actually being delivered via the duct 24 during a period of time are then generally determined and thereafter adjusted as necessary.

Although the ultrasonic transducer flowmeter system 20 of FIG. 1 is reasonably effective when operating in environments wherein noncryogenic temperatures are involved, the system 20 is generally not very effective in an operating environment wherein cryogenic temperatures are involved. For example, onboard a liquid-propellant type rocket wherein cryogenic liquids are circulated about the super-hot combustion chamber and nozzle for cooling and other purposes, a medium such as a gel, an epoxy, or a grease, as employed within the system 20, that is utilized to couple a piezoelectric ceramic wafer to a duct in which liquid oxygen, for example, is being conveyed is highly prone to freezing. The reason for such is because liquid oxygen, in its characteristic cold liquefied form, commonly has a temperature that extends below 300° F. Any such freezing of the wafer-coupling medium in conjunction with the extreme and violent vibration caused by an operating thrusting engine typically causes micro-cracking, fracture, and delamination in the medium. Consequently, any wafer coupled to the duct by any such medium is typically separated, to some degree, from the outer surface of the duct. As a result, the flow rate of the liquid oxygen through the duct is thereby rendered potentially undeterminable.

Figure 2:
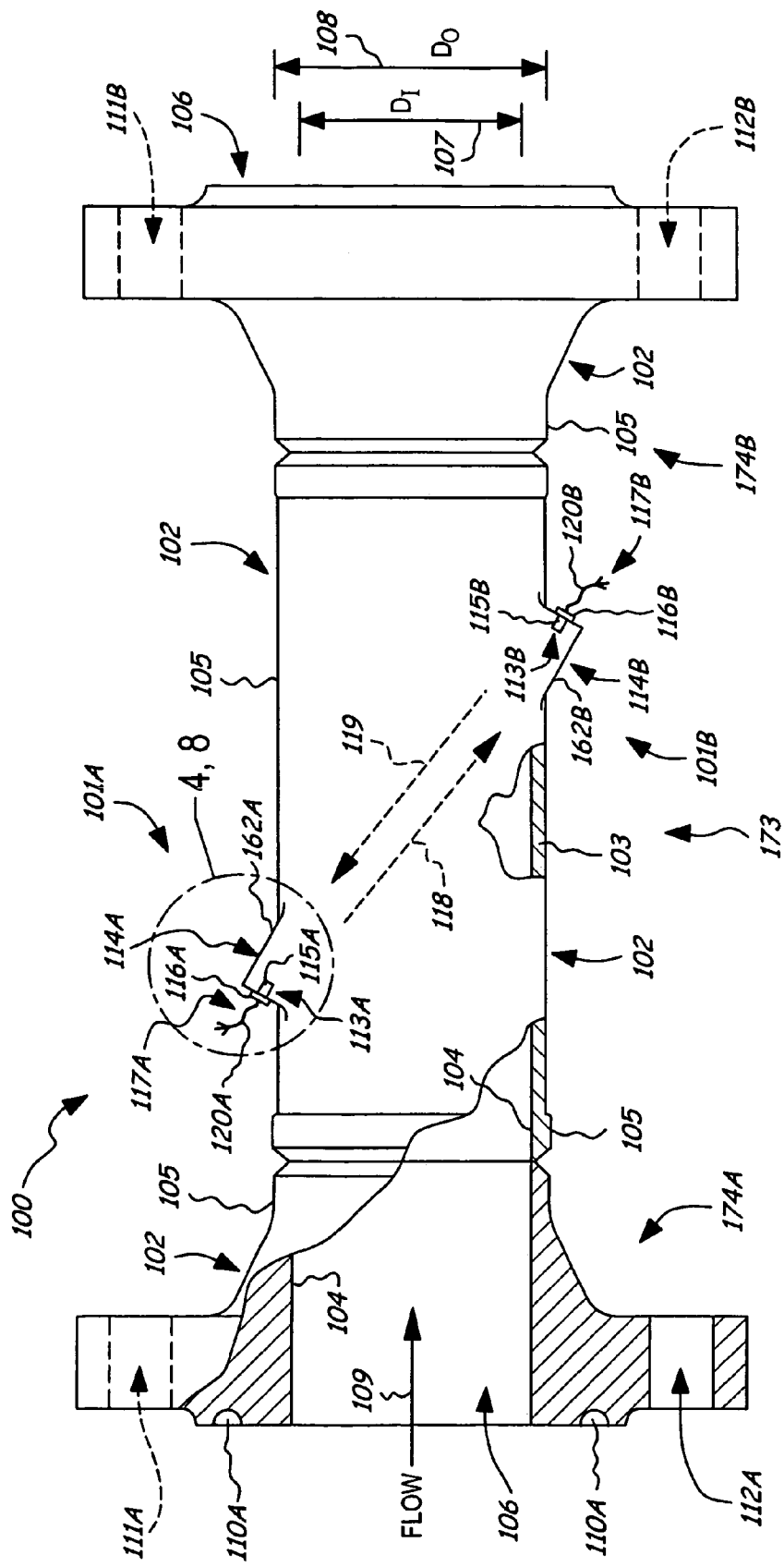
FIG. 2 is a partially sectional view of two ultrasonic transducer assemblies in a first embodiment of the present invention. In this view, the two ultrasonic transducer assemblies are shown to largely include housings that are configured on the top and bottom of a common duct in an offset fashion to thereby help monitor the flow rate of a fluid flowing therethrough.

In FIGS. 2 through 9, an ultrasonic transducer flowmeter system 100 is shown and herein proposed as a remedy to the afore-mentioned problem of wafer-coupling media becoming delaminated in a cryogenic temperature and vibratory operating environment. The ultrasonic transducer flowmeter system 100, in general, is a first practicable embodiment of the present invention disclosed herein. As illustrated in FIG. 2, the ultrasonic transducer flowmeter system 100 basically includes two ultrasonic transducer assemblies 101A and 101B that are mounted on a common section of duct 102. The two ultrasonic transducer assemblies 101A and 101B are particularly mounted on the duct section 102 such that they are on opposite sides of the duct section 102 and are slightly offset from each other along the length of the duct section 102. In the configuration particularly set forth in FIG. 2, the ultrasonic transducer assembly 101A is situated upstream and the ultrasonic transducer assembly 101B is situated downstream relative to the direction of flow 109 of liquid oxygen, for example, passing through the duct section 102. Situated as such, the upstream ultrasonic transducer assembly 101A and the downstream ultrasonic transducer assembly 101B thereby cooperatively help monitor the flow rate of liquid oxygen flowing through the duct section 102.

As illustrated in FIG. 2, the duct section 102 itself is substantially cylindrical and includes a wall 103 having both an inner surface 104 and an outer surface 105. The inner surface 104, first of all, delimits an inner diameter ($D_I$) 107 for the duct section 102. In doing so, the inner surface 104 thereby defines a hollow 106 within the duct section 102 through which liquid oxygen is permitted to flow in the direction 109. The outer surface 105, on the other hand, defines a tubulate middle section 173 fixed between two flange end sections 174A and 174B. Together, the tubulate middle section 173 and the two flange end sections 174A and 174B cause the duct section 102 to outwardly resemble a spool. Within such a configuration, the outer surface of the tubulate middle section 173 thereby delimits an outer diameter ($D_O$) 108 for the duct section 102 in general. The two flange end sections 174A and 174B, in turn, respectively include grooves 10A and 10B (not shown) that encircle the hollow 106 at opposite ends of the duct section 102. Defined and arranged as such, the encircling grooves 110A and 110B facilitate mating of the duct section 102 with, for example, other sections of duct. In addition thereto, the two flange end sections 174A and 174B also respectively include holes 11A, 112A and 111B, 112B defined through their respective peripheries. These holes facilitate fastening of the duct section 102 to other sections of duct with, for example, bolts or fastening rods.

Figure 6:
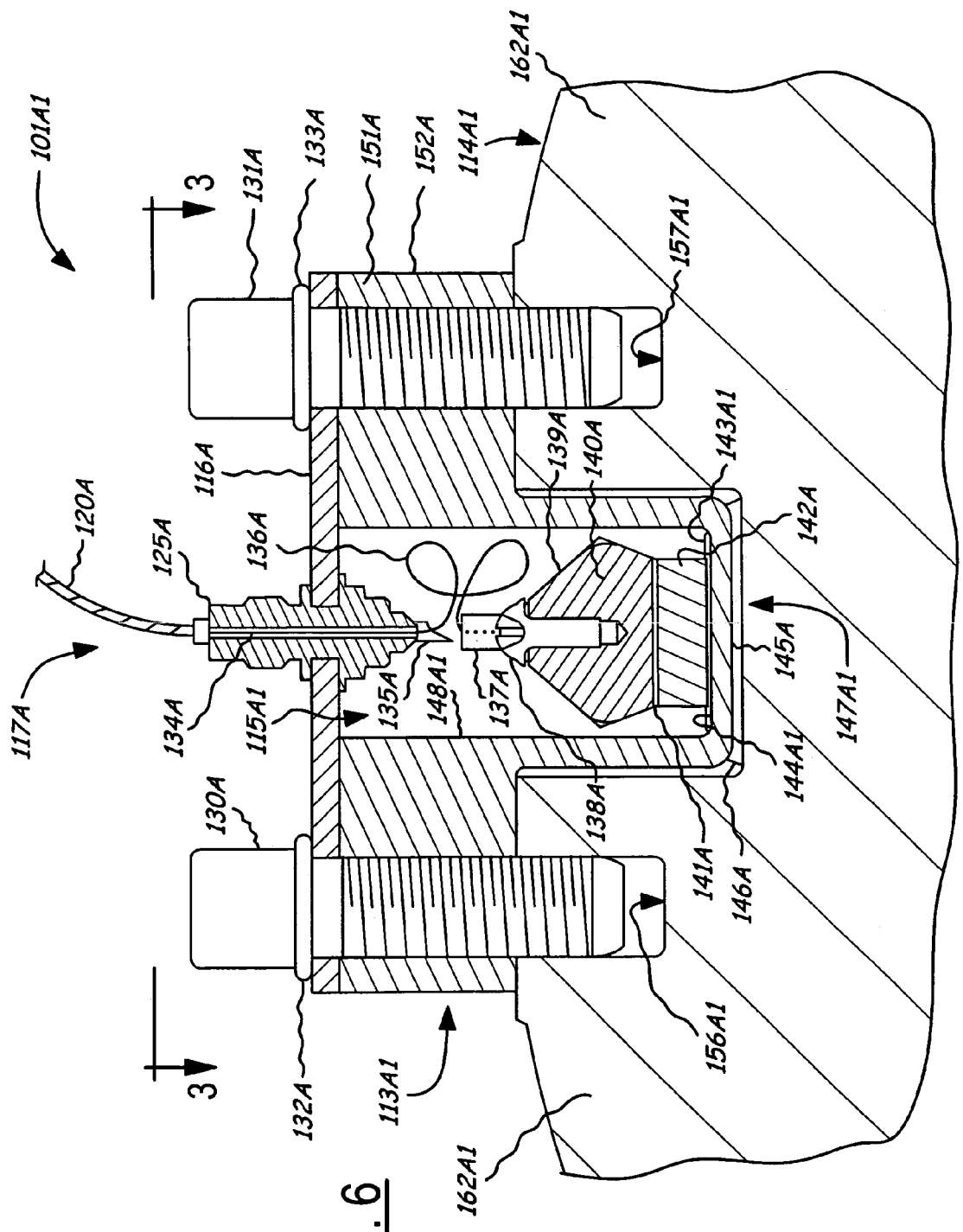
FIG. 6 is also a close-up sectional view of the top ultrasonic transducer assembly shown in FIG. 2. In this view, the housing associated with the top ultrasonic transducer assembly is alternatively shown, as indicated in FIG. 3, from a vantage generally rotated 90 degrees from the vantage of FIG. 4.
Figure 16A:
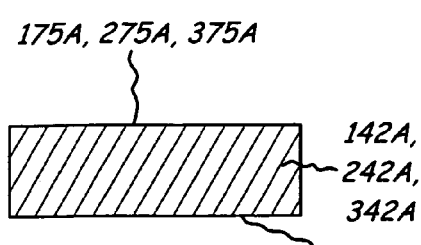
FIG. 16A is a sectional view of a piezoelectric transducer element included within various embodiments of ultrasonic transducer assemblies pursuant to the present invention. In this view, the piezoelectric transducer element is shown to include both a first contact surface and a second contact surface.

As illustrated in FIGS. 2 through 9, the two ultrasonic transducer assemblies 101A and 101B themselves have structures that are generally identical to each other. The upstream ultrasonic transducer assembly 101A, for example, basically includes a piezoelectric transducer element 142A, a housing 113A, and an electrical signals conducting means 117A. As illustrated in FIG. 16A, the piezoelectric transducer element 142A, first of all, has both a first contact surface 175A and an opposite second contact surface 176A. As further illustrated in FIG. 16B, the first contact surface 175A is electroplated with a first metallic film layer 177A, and the second contact surface 176A is electroplated with a second metallic film layer 178A. Although various other constituent soft metals such as gold, indium, or the like may be utilized, the first and second metallic film layers 177A and 178A themselves preferably comprise silver due, at least in part, to its desirable solderability and electrical conductivity characteristics. As best illustrated in FIGS. 2, 4, and 6, the housing 113A, in turn, is both configured on and at least partially conterminous with the outer surface 105 of the duct section 102. The housing 113A itself has a chamber 115A in which the piezoelectric transducer element 142A is situated and thereby substantially enclosed. The electrical signals conducting means 117A, last of all, serves to conduct electrical signals between the electroplated first contact surface 175A of the piezoelectric transducer element 142A and the outside of the housing 113A. In such an ultrasonic transducer assembly 101A, the electroplated second contact surface 176A of the piezoelectric transducer element 142A is generally solder-mounted within the housing 113A such that the element 142A is thereby coupled to the outer surface 105 of the duct section 102 in a substantially conterminous fashion.

Although other constituent piezoelectric materials may be utilized, the piezoelectric transducer element 142A itself is preferably a ceramic crystal wafer having a lead zirconate titanate (PZT) composition. In successful embodiments built to date, ceramic crystal wafers purchased from Piezo Kinetics Incorporated of Bellefonte, Pa. have been utilized. As purchased, each ceramic crystal wafer is generally shaped as a disk and has a diameter of about ⅜ inch and a thickness of approximately 80 mils. In addition, each ceramic crystal wafer, as purchased, is particularly of a PZT-5™ material type and has an inherent Curie temperature of about 500 to 700° F. associated therewith. Lastly, as purchased, each ceramic crystal wafer also has two very thin metallic electrodes (not shown) situated thereon. One of the two metallic electrodes is attached to the top of the ceramic crystal wafer, and the other of the two metallic electrodes is attached to the bottom of the ceramic crystal wafer. Although other constituent metallic materials may also be suitable, the two electrodes attached to the ceramic crystal wafer, as purchased, each largely comprise silver.

As shown in FIGS. 3 through 7, the housing 113A1 particularly included within the ultrasonic transducer assembly 101A1 comprises a plurality of pieces. The pieces, in general, are attached together and collectively situated on the outer surface 105 of the duct section 102. As best illustrated in FIGS. 4 and 6, the housing 113A1 itself particularly includes a wallmount structure 162A1, an open-topped enclosure 151A, and a removable metallic cover plate 116A.

The wallmount structure 162A1, first of all, is generally shaped as a Lilliputian hillock that is integral with, or intimately attached to, the outer surface 105 of the duct section 102. Shaped and situated as such, the wallmount structure 162A1 is thereby largely conterminous with the outer surface 105 of the duct wall 103. Although other constituent materials may indeed be utilized, the wallmount structure 162A1 itself is preferably made of metal, for such is the common constituent material of the duct section 102 in many operating environments to which the present invention is more likely applicable. Furthermore, to physically accommodate the enclosure 151A for the purpose of mounting, the wallmount structure 162A1 has, as best shown in FIG. 6, a fitted well-like hole 147A1 and also two threaded bolt holes 156A1 and 157A1 defined within its outer surface 114A1.

The open-topped enclosure 151A, in turn, may itself be made of, for example, metal, plastic, or even ceramic material. As illustrated in FIGS. 3 through 7, the enclosure 151A has a partially fitted external surface 152A. When viewed from the top, the external surface 152A of the enclosure 151A is generally shaped as a somewhat rounded diamond, as particularly suggested in FIG. 3. When alternatively viewed from the side, the external surface 152A of the enclosure 151A is fittingly shaped such that, first, the upper portion of the enclosure 151A snugly rests on the outer surface 114A1 of the wallmount structure 162A1 and, second, the lower portion of the enclosure 151A closely nests within the hole 147A1 defined in the wallmount structure 162A1. Most preferably, the bottom surface portion 145A of the external surface 152A of the enclosure 151A is specifically shaped to physically complement and closely match the shape or contour of the bottom surface of the hole 147A1. As best illustrated in FIG. 4, the hole 147A1 in the wallmount structure 162A1 is particularly defined in a non-vertical or tilted fashion. In this way, the enclosure 151A is both mounted and precisely oriented within the hole 147A1 such that the second contact surface 176A of the piezoelectric transducer element 142A situated within the enclosure 151A generally faces the second contact surface 176B (not shown) of the piezoelectric transducer element 142B (not shown) included within the downstream ultrasonic transducer assembly 101B. Furthermore, to establish conterminous coupling between the lower portion of the enclosure 151A and the wallmount structure 162A1, the external surface 152A of the lower portion of the enclosure 151A is electroplated with a "wet" metallic film layer 146A just prior to the enclosure 151A being pressed and mounted within the hole 147A1 during fabrication assembly. In this way, the metallic film layer 146A, at the very least, particularly establishes conterminous coupling between a bottom surface portion 145A of the external surface 152A of the enclosure 151A and the bottom of the hole 147A1 within the wallmount structure 162A1. Although various other constituent soft metals such as, for example, silver or indium may be utilized, the metallic film layer 146A itself preferably comprises gold due, at least in part, to its desirable resistance to corrosion.

As best illustrated in FIGS. 4 through 7, the enclosure 151A is internally shaped, on the other hand, so as to define two threaded screw holes 149A1 and 150A1, two threaded bolt holes 160A and 161A, and the aforementioned chamber 115A1. The two threaded screw holes 149A1 and 150A1, first of all, are sized for tightly accommodating two threaded screws 126A and 127A. The two threaded bolt holes 160A and 161A, in turn, are sized for tightly accommodating two threaded bolts 130A and 131A. The chamber 115A1, lastly, is somewhat generously sized so as to physically accommodate both the piezoelectric transducer element 142A and part of the electrical signals conducting means 117A.

The chamber 115A1 itself has an internal surface 148A1 that is at least partially electroplated with an internal metallic film layer (not particularly shown). Although various other constituent soft metals such as, for example, gold or indium may be utilized, the internal metallic film layer itself preferably comprises silver due, at least in part, to its desirable solderability and electrical conductivity characteristics. In order to fixedly situate the piezoelectric transducer element 142A within the chamber 115A1 such that the element 142A is successfully coupled to the enclosure 151A in a substantially conterminous fashion, the second metallic film layer 178A electroplated on the second contact surface 176A of the element 142A is solder-mounted to the internal metallic film layer in an area that specifically covers a floor surface portion 144A1 of the internal surface 148A1 of the chamber 115A1. In this way, a bond layer 143A1 (i.e., a solder joint) is ultimately formed between the second contact surface 176A of the element 142A and the floor surface portion 144A1 of the chamber 115A1. To ensure that the bond layer 143A1 has desirable adhesion characteristics and the piezoelectric transducer element 142A retains its piezoelectric properties, the solder-mounting of the element 142A to the floor surface portion 144A1 of the chamber 115A1 is preferably carried out with an indium alloy type solder and a low-temperature oven reflow process. To further ensure such desirable adhesion characteristics, the material composition of the bond layer 143A1 is preferably designed such that the layer 143A1 has an overall inherent thermal coefficient of expansion (TCE) that is generally numerically between the inherent TCE of the piezoelectric transducer element 142A and the inherent TCE of the enclosure 151A.

Figure 3:
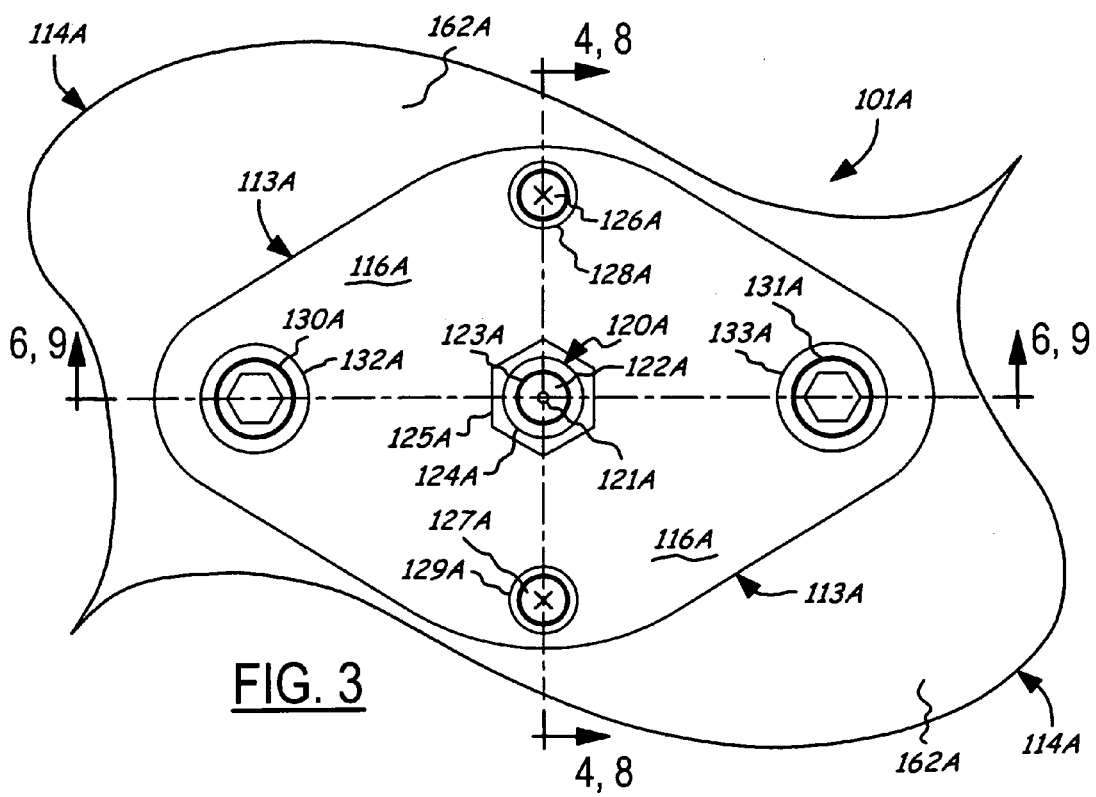
FIG. 3 is generally a plan view of the top ultrasonic transducer assembly shown in FIG. 2.

As shown in FIGS. 3 through 7, the removable metallic cover plate 116A itself is shaped such that it evenly matches and thereby substantially covers the open top of the enclosure 151A. Shaped as such, the cover plate 116A has a plurality of holes defined therethrough. These holes, in particular, include two threaded screw holes 153A and 155A, two threaded bolt holes 158A and 159A, and a hole 154A for physically accommodating the aforementioned electrical signals conducting means 117A. The two threaded screw holes 153A and 155A, first of all, are sized for tightly accommodating the two threaded screws 126A and 127A. In addition, the two threaded screw holes 153A and 155A are also collinearly aligned respectively with the two threaded screw holes 149A1 and 150A1 defined in the upper portion of the enclosure 151A. The two threaded bolt holes 158A and 159A, in turn, are sized for tightly accommodating the two threaded bolts 130A and 131A. In addition, the two threaded bolt holes 158A and 159A are also collinearly aligned respectively with both the two threaded bolt holes 160A and 161A defined in the upper portion of the enclosure 151A and also the two threaded bolt holes 156A1 and 157A1 defined in the outer surface 114A1 of the wallmount structure 162A1. Given such hole alignment, the cover plate 116A can be removably fastened onto the open top of the enclosure 151A with the two threaded screws 126A and 127A and a pair of small annular washers 128A and 129A as shown in FIGS. 3 and 4. To facilitate airtight sealing of the chamber 115A1 within the enclosure 151A in order to help prevent the infiltration of contaminants and corrosion, a thin layer (not shown) of silicone grease, for example, is preferably applied on the bottom surface 179A of the cover plate 116A prior to being fastened onto the top of the enclosure 151A. Furthermore, the cover plate 116A along with the enclosure 151A can also be removably fastened onto the wallmount structure 162A1 with the two threaded bolts 130A and 131A and a pair of large annular washers 132A and 133A as shown in FIGS. 3 and 6. Given such a configuration, open access is thereby provided to any contents situated within the chamber 115A1 of the enclosure 151A whenever the cover plate 116A is removed. In this way, the contents within the chamber 115A1 can be serviced as desired or as necessary.

As briefly alluded to earlier hereinabove, the electrical signals conducting means 117A primarily serves the role of conducting electrical signals between the electroplated first contact surface 175A of the piezoelectric transducer element 142A and the outside of the housing 113A1. In this way, an electric control circuit (not shown) remotely situated outside of the housing 113A1 can thereby transmit or receive electrical signals to or from the piezoelectric transducer element 142A for the purpose of determining the flow rate of the liquid oxygen passing through the duct section 102. As illustrated in FIGS. 4 and 6, the electrical signals conducting means 117A itself primarily includes a coaxial cable 120A, an electrical connector 125A, a first metallic lug 135A, a bare service wire 136A, a second metallic lug 137A, a metal screw 138A, and an anechoic cone 140A.

As best illustrated in FIGS. 3, 4, and 6, the coaxial cable 120A itself includes an inner conductor 121A, an insulating sleeve 122A, an outer conductor 123A, and an insulating jacket 124A. The inner conductor 121A, first of all, is electrically conductive and primarily serves to help communicate electrical signals between the electroplated first contact surface 175A of the piezoelectric transducer element 142A and the outside of the housing 113A1. The insulating sleeve 122A, next of all, encircles the inner conductor 121A and primarily serves to electrically isolate the inner conductor 121A from the outer conductor 123A. In general, the insulating sleeve 122A itself is made of a dielectric material such as, for example, solid or foamed polyethylene. The outer conductor 123A, in turn, encircles the insulating sleeve 122A and is generally made of woven strands or fibers of electrically conductive material. The outer conductor 123A primarily serves as an electrical grounding means. The insulating jacket 124A, last of all, is made of an electrically insulative material and encircles the outer conductor 123A. Given such a configuration, the insulating jacket 124A thereby primarily serves to contain the inner conductor 121A, the insulating sleeve 122A, and the outer conductor 123A in an orderly and electrically safe fashion.

As shown in FIGS. 4 and 6, the electrical connector 125A itself is installed in a fixed fashion within the hole 154A defined in the removable metallic cover plate 116A. To facilitate airtight sealing of the chamber 115A1 within the enclosure 151A, a small amount of silicone grease, for example, is preferably applied on the outer sides of the connector 125A just prior to being installed within the hole 154A of the cover plate 116A. Along the center axis of the connector 125A, the connector 125A includes a center conductor 134A. On the bottom of the connector 125A, the first metallic lug 135A is thereon fixed such that it is in electrical contact with the center conductor 134A. In general, the connector 125A is structurally configured and constructed such that when the coaxial cable 120A is properly connected to the top of the connector 125A, the inner conductor 121A, the center conductor 134A, and the first metallic lug 135A are all thereby serially connected together in an electrically conductive and communicative fashion. At the same time, the outer conductor 123A of the coaxial cable 120A is thereby electrically grounded via the connector 125A to both the housing 113A1 and the duct wall 103.

The bare service wire 136A, in turn, is electrically interconnected between the first metallic lug 135A and the second metallic lug 137A. In particular, the first end of the service wire 136A is both crimped and soldered onto the first metallic lug 135A, and the second end of the service wire 136A is both crimped and soldered onto the second metallic lug 137A. Connected as such, the service wire 136A thereby primarily serves to conduct electrical signals between the first metallic lug 135A and the second metallic lug 137A. The service wire 136A itself preferably comprises a plurality of electrically conductive strands that are substantially held together via braiding, interweaving, knotting, plaiting, stranding, twisting, tying, and/or wrapping. In this way, the service wire 136A is characteristically highly flexible and is therefore able to endure freezing temperatures as well as withstand extreme and violent vibration without breaking. Furthermore, the service wire 136A, by design, preferably does not have an insulative jacket or covering. The reason for such is because experience has demonstrated that an insulative jacket has the tendency to freeze, become brittle, break apart, and become loose within the chamber 115A1 in an operating environment involving cryogenic temperatures and extreme vibration. When such occurs, the piezoelectric transducer element 142A and its aforementioned two very thin metallic electrodes thereby become susceptible to damage. Thus, it is for this reason that the service wire 136A is, by design, preferably bare. It is to be understood, however, that the service wire 136A may alternatively include an insulative jacket for applications involving less extreme operating environments.

In addition to being both highly flexible and bare, the service wire 136A is extra long in terms of its length. Such extra length, sometimes referred to as a "service loop," permits the cover plate 116A to be unfastened and removed from the top of the enclosure 151A at a distance sufficient to enable a technician, for example, to service the contents of the chamber 115A1 within the overall housing 113A1 during times of non-operation. Given such extra length, preventative care must therefore be exercised to ensure that the bare service wire 136A does not come into contact with the electroplated internal surface 148A1 (i.e., lining) of the chamber 115A1 during actual operation. In this way, electrical signals passing between the aforementioned electric control circuit and the piezoelectric transducer element 142A during operation are not inadvertently electrically "shorted" to the housing 113A1 and duct wall 103. To prevent such electrical shorting from occurring, cotton balls, foam balls, solidifying sponge-type Styrofoam™, or the like (not shown), for example, are preferably packed and stuffed about the bare service wire 136A in a manner that both physically supports and electrically isolates the wire 136A from the internal surface 148A1 of the chamber 115A1. As an alternative, an insulative cylindrical liner (not shown) may instead be slipped down into the chamber 115A1 such that the liner closely lines and covers the electroplated internal surface 148A1 of the chamber 115A1.

As illustrated in FIGS. 4 and 6, the second metallic lug 137A is integral with or fixedly attached onto the top of the metal screw 138A such that the lug 137A and the screw 138A are in electrical contact with each other. The metal screw 138A itself, in turn, is threaded and is thereby tightly received within a threaded hole defined within the anechoic cone 140A. The anechoic cone 140A itself is characteristically reverberation resistant and thereby helps facilitate the substantially echo-free and unidirectional transmission and receipt of ultrasonic acoustic signals between the piezoelectric transducer element 142A of the upstream ultrasonic transducer assembly 101A1 and the piezoelectric transducer element 142B of the downstream ultrasonic transducer assembly 101B.

In addition to being reverberation resistant, the anechoic cone 140A has an outside surface 139A at least partially electroplated with an outside metallic film layer (not particularly shown). Although various other constituent soft metals such as, for example, gold or indium may be utilized, the outside metallic film layer itself preferably comprises silver due, at least in part, to its desirable solderability and electrical conductivity characteristics. In order to fixedly situate the anechoic cone 140A onto the first contact surface 175A of the piezoelectric transducer element 142A such that the cone 140A is successfully coupled to the element 142A in a substantially conterminous fashion, a flat bottom surface portion of the electroplated outside surface 139A of the cone 140A is solder-mounted onto the first metallic film layer 177A electroplated on the first contact surface 175A of the element 142A. In this way, a bond layer 141A (i.e., a solder joint) is ultimately formed between the outside surface 139A of the anechoic cone 140A and the first contact surface 175A of the element 142A. To ensure that the bond layer 141A has desirable adhesion characteristics and the piezoelectric transducer element 142A retains its piezoelectric properties, the solder-mounting of the anechoic cone 140A onto the element 142A is preferably carried out with an indium alloy type solder and a low-temperature oven reflow process. To further ensure such desirable adhesion characteristics, the material composition of the bond layer 141A is preferably designed such that the layer 141A has an overall inherent thermal coefficient of expansion (TCE) that is generally numerically between the inherent TCE of the piezoelectric transducer element 142A and the inherent TCE of the anechoic cone 140A. Within such a configuration, the anechoic cone 140A thereby further serves to conduct electrical signals between the metal screw 138A and the first contact surface 175A of the piezoelectric transducer element 142A.

During operation of the ultrasonic transducer flowmeter system 100 in FIGS. 2 through 7, the aforementioned electric control circuit initially transmits an electrical signal along the electrical signals conducting means 117A to the piezoelectric transducer element 142A of the upstream ultrasonic transducer assembly 101A1. Upon receiving the electrical signal, the upstream element 142A immediately converts the electrical signal into an ultrasonic acoustic signal and transmits the acoustic signal in a direction 118, through the duct section 102, and toward the piezoelectric transducer element 142B of the downstream ultrasonic transducer assembly 101B. Upon receiving the acoustic signal, the downstream element 142B immediately converts the acoustic signal into an electrical signal which is then conducted along an electrical signals conducting means 117B and received by the control circuit. Upon receiving the electrical signal, the control circuit then calculates the downstream transit time of the acoustic signal through the duct section 102 based on the elapsed time between the initial transmission of an electrical signal to the upstream element 142A and the later receipt of an electrical signal from the downstream element 142B. Thereafter, the control circuit then transmits an electrical signal along the electrical signals conducting means 117B to the downstream element 142B. Upon receiving the electrical signal, the downstream element 142B immediately converts the electrical signal into an ultrasonic acoustic signal and transmits the acoustic signal in a direction 119, through the duct section 102, and toward the upstream element 142A. Upon receiving the acoustic signal, the upstream element 142A immediately converts the acoustic signal into an electrical signal which is then conducted along the electrical signals conducting means 117A and received by the control circuit. Upon receiving the electrical signal, the control circuit then calculates the upstream transit time of the acoustic signal through the duct section 102 based on the elapsed time between the initial transmission of an electrical signal to the downstream element 142B and the later receipt of an electrical signal from the upstream element 142A. After both the downstream and upstream transit times have been calculated in this manner, the control circuit then compares the two transit times and calculates their difference. Once calculated, the transit time difference is then used by the control circuit to substantially determine the real time velocity of the liquid oxygen passing through the duct section 102. After determining the velocity, known dimensions of the duct section 102 such as its inner diameter ($D_I$) 107 and associated cross-sectional area are then utilized to determine a flow rate by multiplying the velocity of the liquid oxygen by the cross-sectional area of the duct section 102. Once the flow rate is determined, the volume and amount of liquid oxygen actually being delivered via the duct section 102 during a period of time are then generally determined and thereafter adjusted as necessary.

Figure 9:
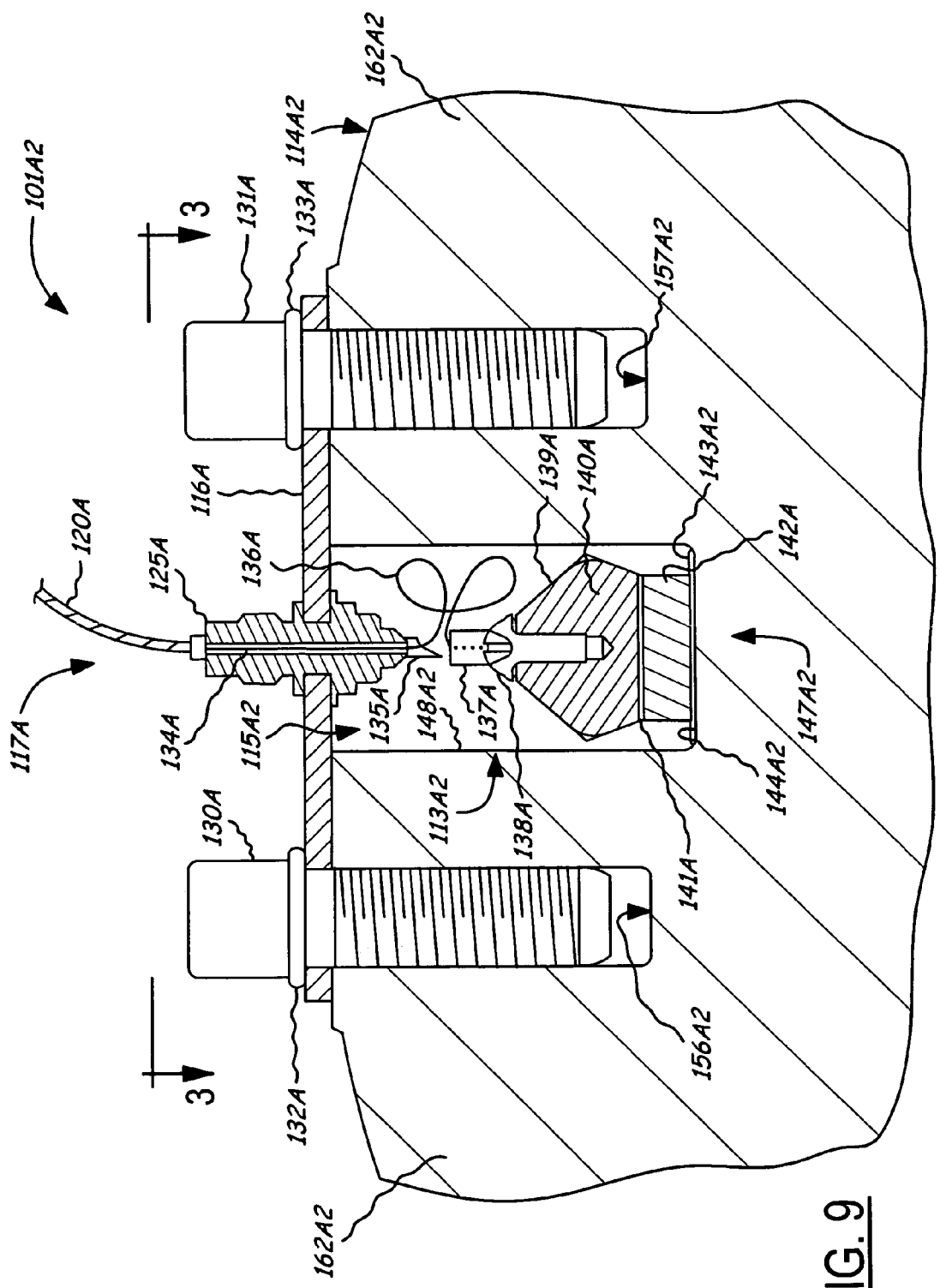
FIG. 9 is also a close-up sectional view of the structural variation of the top ultrasonic transducer assembly shown in FIGS. 2 and 3. In this view, the housing associated with the top ultrasonic transducer assembly is alternatively shown, as indicated in FIG. 3, from a vantage generally rotated 90 degrees from the vantage of FIG. 8.

In FIGS. 8 and 9, close-up sectional views of a structural variation of the upstream (i.e., top) ultrasonic transducer assembly 101A in FIGS. 2 and 3 are shown. In particular, the variant ultrasonic transducer assembly 101A2 in FIGS. 8 and 9 is sans both the enclosure 151A and the coupling metallic film layer 146A included in the ultrasonic transducer assembly 101A1 of FIGS. 4 through 7. Although the variant ultrasonic transducer assembly 101A2 is much simpler in terms of how the second contact surface 176A of the piezoelectric transducer element 142A is ultimately coupled to the duct wall 103, it is somewhat more cumbersome to fabricate and service since the housing 113A2 itself is largely altogether integral with the duct wall 103.

In contrast to identified features of the heretofore-discussed first embodiment of the present invention which are designated with reference numerals in the 100"s within FIGS. 2 through 9, features of second and third embodiments of the present invention discussed hereinafter in FIGS. 10 through 15 are designated with reference numerals in the 200"s and 300"s. In general, like, similar, or somewhat comparable features among the three embodiments generally share the same second and third numerical digits in their reference numeral designations. More particularly, however, the degree of similarity or dissimilarity between comparable features in different embodiments of the present invention should be determined from the context in which the features are illustrated and discussed within the drawings and text addressing the different embodiments. Furthermore, as has been done heretofore herein, mirroring features within a given embodiment are frequently distinguished from each other with an "A" or "B" simply appended to their respective numerical designations.

Figure 10A:
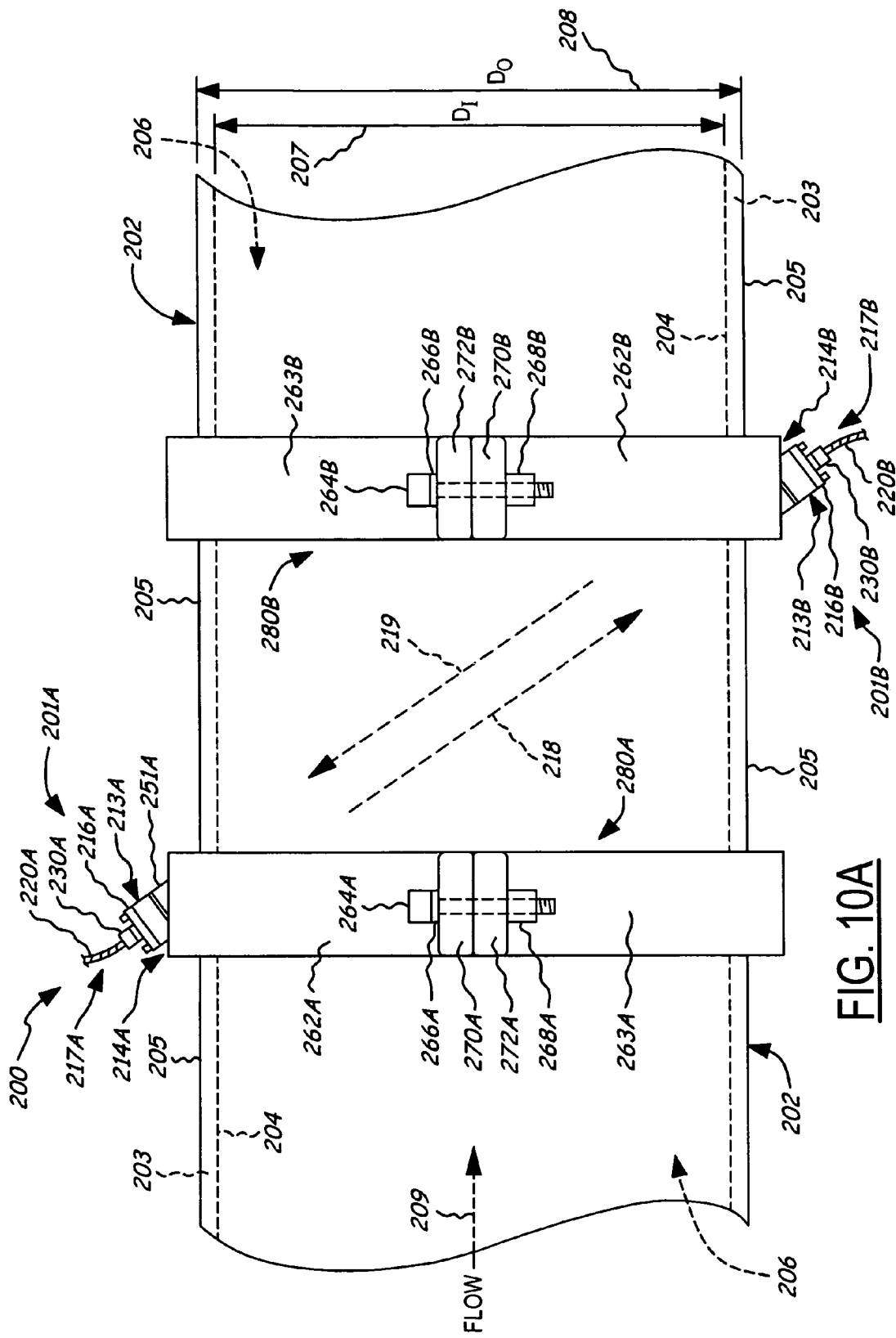
FIG. 10A is a view of two ultrasonic transducer assemblies in a second embodiment of the present invention. In this view, as compared to FIG. 2, the two ultrasonic transducer assemblies are shown to largely include housing enclosures that are alternatively configured on the top and bottom of a common duct in an offset fashion with separate bracket assemblies.
Figure 10B:
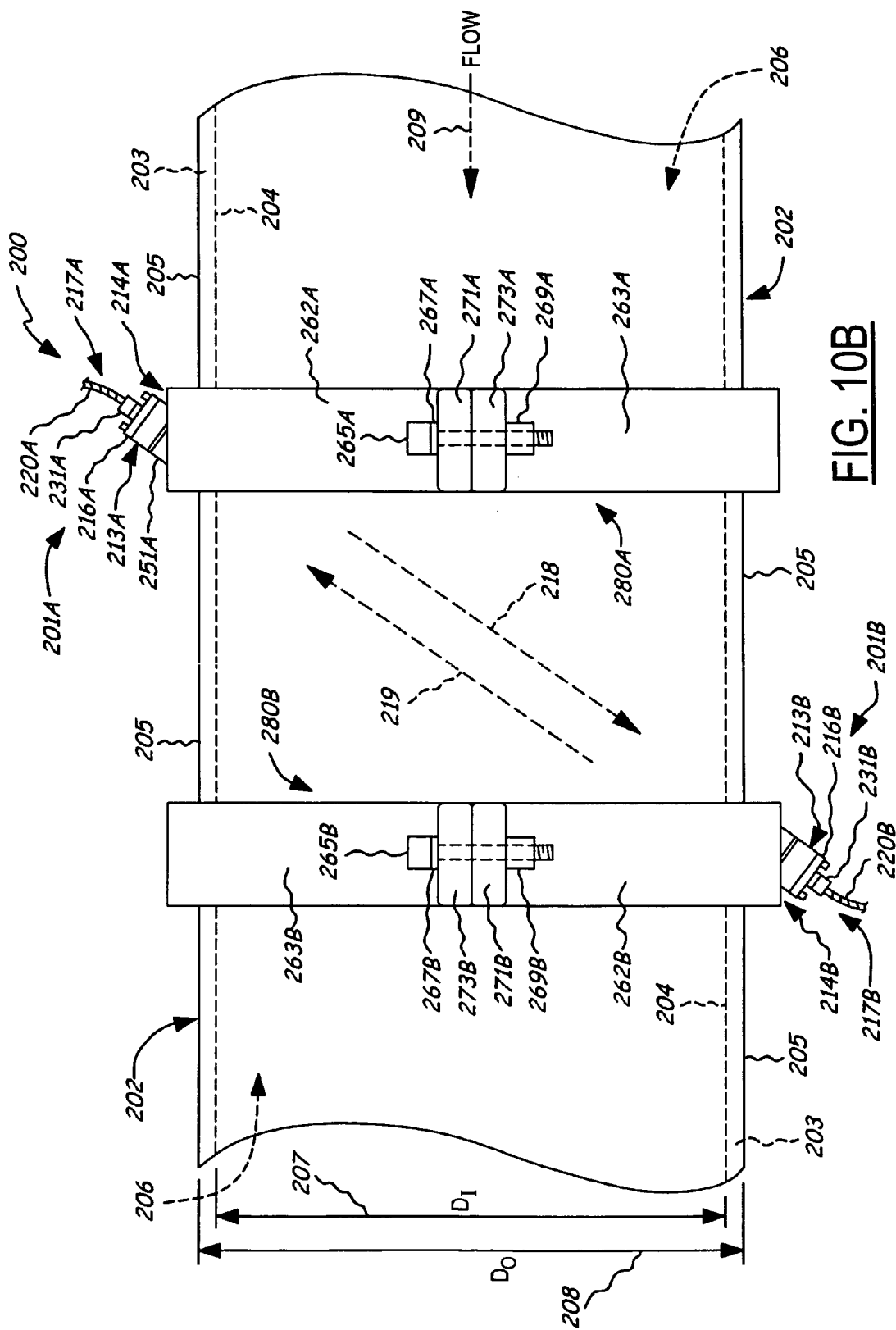
FIG. 10B is also a view of the two ultrasonic transducer assemblies shown in FIG. 10A. In this view, the two ultrasonic transducer assemblies are alternatively shown from a vantage generally rotated 180 degrees from the vantage of FIG. 10A (i.e., an opposite side vantage).

In FIGS. 10A and 10B, an ultrasonic transducer flowmeter system 200 pursuant to a second practicable embodiment of the present invention is shown. Similar to the first embodiment ultrasonic transducer flowmeter system 100 in FIG. 2, the second embodiment ultrasonic transducer flowmeter system 200 in FIGS. 10A and 10B basically includes two ultrasonic transducer assemblies 201A and 201B that are mounted on a common section of duct 202. The two ultrasonic transducer assemblies 201A and 201B are particularly mounted on the duct section 202 such that they are on opposite sides of the duct section 202 and are slightly offset from each other along the length of the duct section 202. In this configuration, the two ultrasonic transducer assemblies 201A and 201B thereby help to monitor the flow rate of a fluid, such as liquid oxygen, flowing through the duct section 202 in a direction 209. To particularly accomplish such, ultrasonic acoustic signals are transmitted between the upstream ultrasonic transducer assembly 201A and the downstream ultrasonic transducer assembly 201B in directions 218 and 219.

In general, the two second embodiment ultrasonic transducer assemblies 201A and 201B themselves are substantially similar to the two first embodiment ultrasonic transducer assemblies 101A1 and 101B1. More particularly, however, the two second embodiment ultrasonic transducer assemblies 201A and 201B alternatively include separate bracket assemblies 280A and 280B, instead of wallmount structures 162A and 162B as in FIG. 2, for mounting and configuring their respective housings 213A and 213B on the outer surface 205 of the duct wall 203. As illustrated in FIGS. 10A and 10B, the bracket assembly 280A associated with the upstream ultrasonic transducer assembly 201A is substantially identical to the bracket assembly 280B associated with the downstream ultrasonic transducer assembly 201B. As an example, the bracket assembly 280A associated with the upstream ultrasonic transducer assembly 201A, in particular, includes both a C-shaped primary wallmount bracket 262A and a C-shaped secondary wallmount bracket 263A. The primary wallmount bracket 262A, first of all, includes separate flanges 270A and 271A at its two ends. The secondary wallmount bracket 263A, in turn, similarly includes separate flanges 272A and 273A at its two ends. Defined completely through each of the flanges 270A, 271A, 272A, and 273A is a hole. Given such holes, the flange 270A of the primary wallmount bracket 262A and the flange 272A of the secondary wallmount bracket 263A can thereby be tightly fastened together with a fastening bolt 264A, a washer 266A, and a nut 268A as shown in FIG. 10A. Similarly, the flange 271A of the primary wallmount bracket 262A and the flange 273A of the secondary wallmount bracket 263A can also thereby be tightly fastened together with a fastening bolt 265A, a washer 267A, and a nut 269A as shown in FIG. 10B. When tightly fastened together as such, the primary wallmount bracket 262A and the secondary wallmount bracket 263A are thereby cinched about the outer surface 205 of the duct wall 203 such that they cooperatively encircle the duct section 202. When configured as such, the lower portion of the enclosure 251A included within the overall housing 213A of the upstream ultrasonic transducer assembly 201A is conterminously coupled to the outer surface 205 of the duct wall 203 via a hole defined completely through both the outer surface 214A and cross-section of the primary wallmount bracket 262A.

Figure 11:
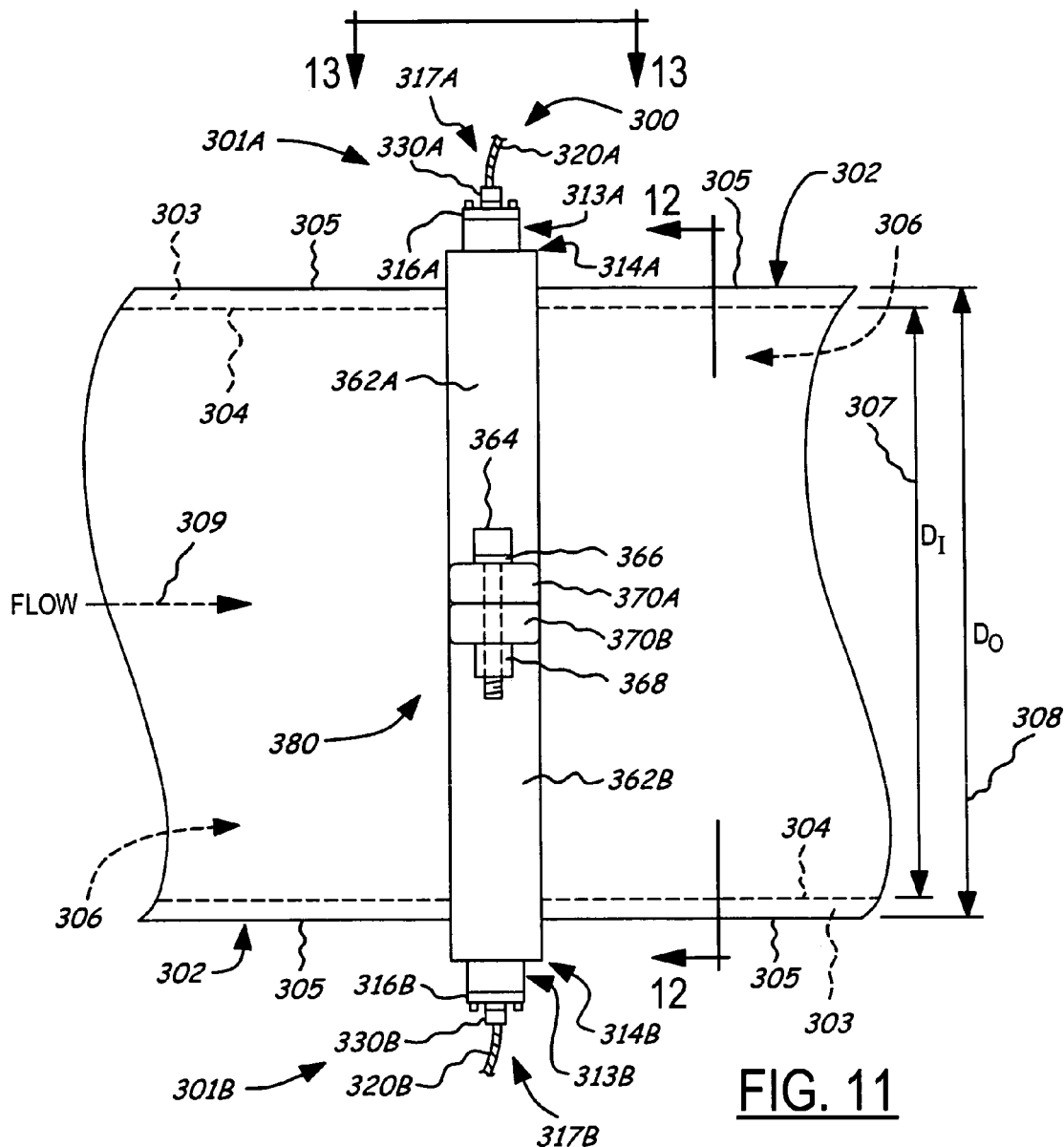
FIG. 11 is a view of two ultrasonic transducer assemblies in a third embodiment of the present invention. In this view, as compared to FIGS. 2 and 10, the two ultrasonic transducer assemblies are shown to largely include housing enclosures that are alternatively configured on the top and bottom of a common duct in a diametric fashion with a common bracket assembly. In this diametric configuration, the two ultrasonic transducer assemblies alternatively serve to help monitor the temperature of a fluid flowing through the duct.
Figure 12:
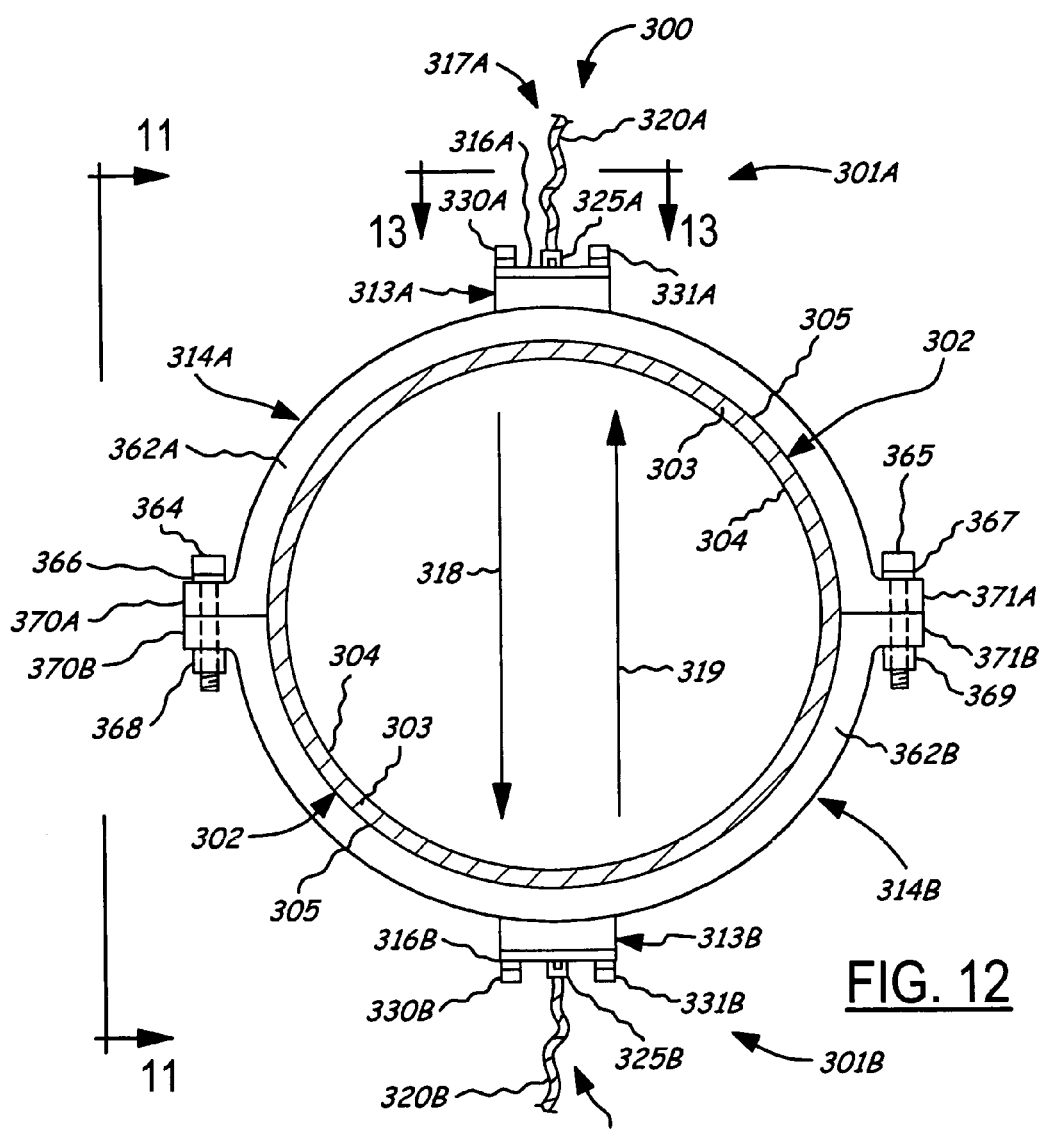
FIG. 12 is a partially cross-sectional view of the two ultrasonic transducer assemblies and the duct shown in FIG. 11. In this view, the two ultrasonic transducer assemblies and the duct are alternatively shown from a vantage generally rotated 90 degrees from the vantage of FIG. 11.

In FIGS. 11 through 15, an ultrasonic transducer fluid thermometer system 300 pursuant to a third practicable embodiment of the present invention is shown. Similar to both the first and second embodiment ultrasonic transducer flowmeter systems 100 and 200 in FIGS. 2 and 10A, the third embodiment ultrasonic transducer fluid thermometer system 300 in FIG. 11 basically includes two ultrasonic transducer assemblies 301A and 301B that are mounted on a common section of duct 302. Instead, however, of being offset along the length of the duct as in the first two embodiments, the two ultrasonic transducer assemblies 301A and 301B are particularly mounted on opposite sides of the duct section 302 in a directly diametric fashion. In such a configuration, the two ultrasonic transducer assemblies 301A and 301B are thereby utilized to help monitor the temperature of a fluid, such as liquid oxygen, flowing through the duct section 302 in a direction 309. To particularly accomplish such, ultrasonic acoustic signals are transmitted between the top ultrasonic transducer assembly 301A and the bottom ultrasonic transducer assembly 301B in one or both directions 318 and 319 as shown in FIG. 12. In measuring and monitoring the transit times of these ultrasonic acoustic signals through the duct section 302, the transit times can then be correlated to a certain fluid temperature, for changes in temperature within a fluid generally correspondingly affect the transit times of acoustic signals passing therethrough. In specifically transmitting the ultrasonic acoustic signals in one or both directions 318 and 319 which are substantially perpendicular to the direction 309 of fluid flow, the specific effect of temperature upon acoustic signal transit times is thereby better isolated from the effect of changes in downstream fluid flow velocities which can also affect signal transit times and thereby potentially skew temperature measurements.

Figure 14:
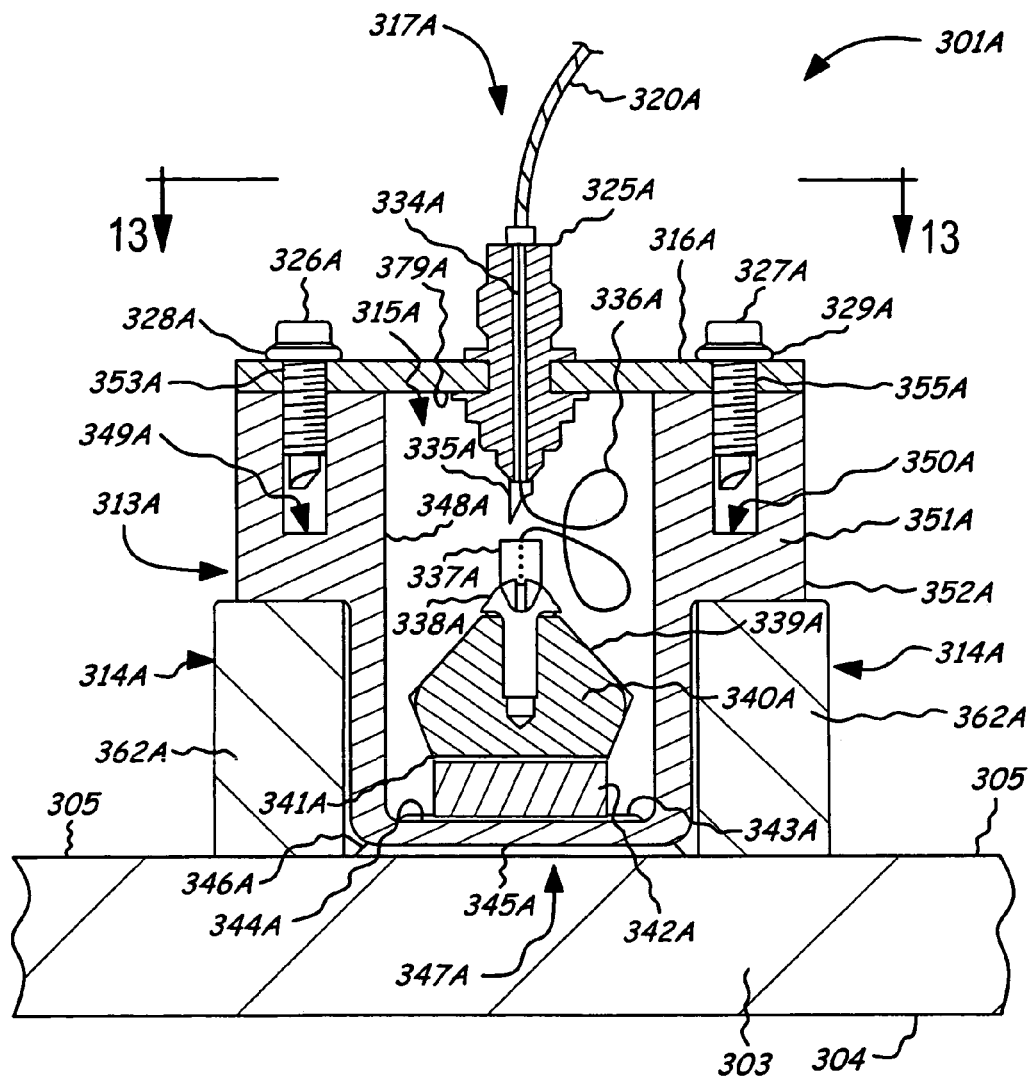
FIG. 14 is a close-up sectional view of the top ultrasonic transducer assembly shown in FIG. 11. In this view, as compared to FIGS. 4 and 8, the housing enclosure associated with the top ultrasonic transducer assembly is alternatively configured on the outer surface of the duct with help from a bracket and a hole defined therethrough.

As illustrated in FIGS. 11 and 12, the two third embodiment ultrasonic transducer assemblies 301A and 301B themselves, in general, are substantially similar to the two second embodiment ultrasonic transducer assemblies 201A and 201B. More particularly, however, the two third embodiment ultrasonic transducer assemblies 301A and 301B alternatively include their own respective C-shaped wallmount brackets 362A and 362B which can be fastened together in a common bracket assembly 380 instead of two wholly separate bracket assemblies 280A and 280B as in FIGS. 10A and 10B. In general, the wallmount brackets 362A and 362B are structurally suited for mounting and configuring their respective housings 313A and 313B on the outer surface 305 of the duct section 302. As best illustrated in FIG. 12, the wallmount bracket 362A associated with the top ultrasonic transducer assembly 301A is substantially identical to the wallmount bracket 362B associated with the bottom ultrasonic transducer assembly 301B. The wallmount bracket 362A, first of all, includes separate flanges 370A and 371A at its two ends. The wallmount bracket 362B, in turn, similarly includes separate flanges 370B and 371B at its two ends. Defined completely through each of the flanges 370A, 371A, 370B, and 371B is a hole. Given such holes, the flange 370A of the wallmount bracket 362A and the flange 370B of the wallmount bracket 362B can thereby be tightly fastened together with a fastening bolt 364, a washer 366, and a nut 368. Similarly, the flange 371A of the wallmount bracket 362A and the flange 371B of the wallmount bracket 362B can also thereby be tightly fastened together with a fastening bolt 365, a washer 367, and a nut 369. When tightly fastened together as such, the wallmount bracket 362A and the wallmount bracket 362B are thereby cinched about the outer surface 305 of the duct wall 303 such that they cooperatively encircle the duct section 302. When configured as such, the lower portion of the enclosure 351A included within the overall housing 313A of the top ultrasonic transducer assembly 301A, for example, is thereby conterminously coupled to the outer surface 305 of the duct wall 303 as best shown in FIGS. 14 and 15. Such conterminous coupling is specifically made possible, as further shown in FIGS. 14 and 15, via a fitted hole 347A defined completely through both the outer surface 314A and the cross-section of the wallmount bracket 362A.

In general, to assemble, build, or fabricate the ultrasonic transducer assembly 301A set forth in FIGS. 11 through 15, a piezoelectric transducer element 342A as in FIG. 16A must generally be obtained. Although other constituent piezoelectric materials such as barium titanate, lead titanate, or even a piezo-composite may be utilized, the piezoelectric transducer element 342A itself is preferably a ceramic crystal wafer having, for example, a lead zirconate titanate (PZT) composition. As briefly alluded to earlier hereinabove, such a ceramic crystal wafer may be purchased, for example, from Piezo Kinetics Incorporated of Bellefonte, Pa. As purchased therefrom, the ceramic crystal wafer is generally shaped as a disk and has a diameter of about ⅜ inch and a thickness of approximately 80 mils. In addition, the ceramic crystal wafer, as purchased, is particularly of a PZT-5™ material type and has an inherent Curie temperature of about 500 to 700° F. associated therewith. Lastly, as purchased, the ceramic crystal wafer also has two very thin metallic electrodes (not shown) situated thereon. One of the two metallic electrodes is attached to the top (i.e., the first contact surface 375A) of the ceramic crystal wafer, and the other of the two metallic electrodes is attached to the bottom (i.e., the second contact surface 376A) of the ceramic crystal wafer. Although other constituent metallic materials may also be suitable, the two electrodes attached to the ceramic crystal wafer, as purchased, each largely comprise silver.

Figure 16B:
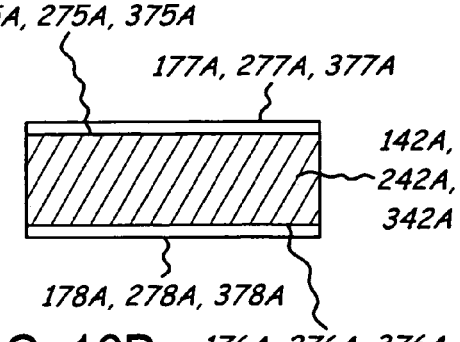
FIG. 16B is a sectional view of the piezoelectric transducer element shown in FIG. 16A. In this view, the first and second contact surfaces of the piezoelectric transducer element are respectively electroplated with first and second metallic film layers.

After obtaining the piezoelectric transducer element 342A, the first contact surface 375A of the element 342A is conventionally electroplated with a first metallic film layer 377A as shown in FIG. 16B. In a similar fashion, the second contact surface 376A of the piezoelectric transducer element 342A is conventionally electroplated with a second metallic film layer 378A. During the electroplating process, however, care must be exercised so that the aforementioned two very thin metallic electrodes respectively situated on the first and second contact surfaces 375A and 376A of the piezoelectric transducer element 342A are not inadvertently damaged or detached. When electroplating is ultimately completed, the first metallic film layer 377A and the second metallic film layer 378A preferably have respective film thicknesses within a range of about 4 to 6 mils. Although various other constituent soft metals such as gold, indium, or the like may be utilized, the first and second metallic film layers 377A and 378A themselves are preferably electroplated such that they both largely comprise silver due, at least in part, to both the desirable solderability and electrical conductivity characteristics inherently associated with silver.

Figure 13:
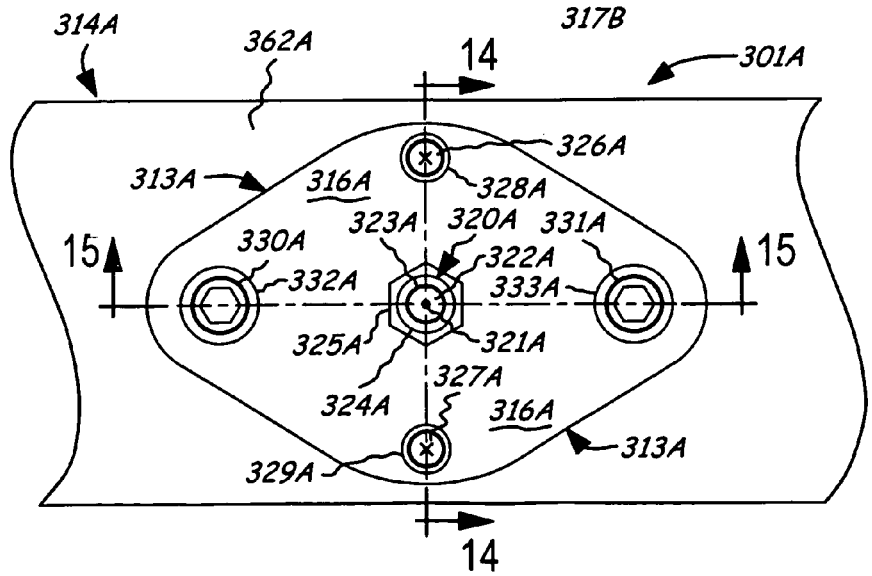
FIG. 13 is a plan view of the top ultrasonic transducer assembly shown in FIGS. 11 and 12.

In addition to obtaining the piezoelectric transducer element 342A, both the open-topped enclosure 351A and the wallmount bracket 362A must be constructed. In general, the open-topped enclosure 351A, first of all, may itself be made of, for example, metal, plastic, or even ceramic material, though metal is generally preferred for electrical grounding purposes. Given such a material composition, the enclosure 351A may therefore be largely fabricated, shaped, and formed via conventional manufacturing processes such as, for example, casting, thermoforming, extrusion, machining, et cetera. When fabrication of the enclosure 351A is completed, the enclosure 351A thereby preferably has a partially fitted external surface 352A defined as shown in FIGS. 13 through 15. The wallmount bracket 362A, on the other hand, is preferably made of metal and may therefore be largely fabricated, shaped, and formed via conventional manufacturing processes such as, for example, casting, machining, et cetera. When fabrication of the wallmount bracket 362A is completed, the wallmount bracket 362A thereby preferably has an outer surface 314A defined as shown in FIGS. 11 through 15 and as was described in detail earlier hereinabove.

When viewed from the top as in FIG. 13, the external surface 352A of the enclosure 351A is generally shaped as a somewhat rounded diamond. When alternatively viewed from the side as in FIGS. 14 and 15, the external surface 352A of the enclosure 351A is fittingly shaped such that, first, the upper portion of the enclosure 351A can snugly rest on the outer surface 314A of the wallmount bracket 362A when assembled and, second, the lower portion of the enclosure 351A can closely nest within the hole 347A defined in the wallmount bracket 362A when assembled. As best illustrated in FIGS. 14 and 15, the hole 347A in the wallmount bracket 362A is particularly defined in a duct-radiate fashion. In this way, when ultimately assembled, the enclosure 351A is both mounted and precisely oriented within the hole 347A such that the second contact surface 376A of the piezoelectric transducer element 342A to be situated within the enclosure 351A generally faces the second contact surface 376B (not shown) of the piezoelectric transducer element 342B (not shown) to be included within the diametrically opposite (i.e., bottom) ultrasonic transducer assembly 301B. Furthermore, to facilitate close and conterminous coupling between the lower portion of the enclosure 351A and the outer surface 305 of the duct wall 303 when assembled, the bottom surface portion 345A of the external surface 352A of the enclosure 351A is specifically contoured (i.e., slightly curved inward in this particular embodiment), as shown in FIG. 15, to physically complement and closely match the contour of the outer surface 305 of the duct wall 303.

As best illustrated in FIGS. 14 and 15, the enclosure 351A is internally shaped and machined, on the other hand, so as to define two threaded screw holes 349A and 350A, two threaded bolt holes 360A and 361A, and a chamber 315A. The two threaded screw holes 349A and 350A, first of all, are sized for tightly accommodating two threaded screws 326A and 327A. The two threaded bolt holes 360A and 361A, in turn, are sized for tightly accommodating two threaded bolts 330A and 331A. The chamber 315A, lastly, is somewhat generously sized so as to physically accommodate, when assembled, both the piezoelectric transducer element 342A and part of an electrical signals conducting means 317A.

In addition to electroplating the first and second contact surfaces 375A and 376A of the piezoelectric transducer element 342A, the internal surface 348A lining the empty chamber 315A within the open-topped enclosure 351A is also largely electroplated. In this way, when electroplating is ultimately completed, an internal metallic film layer (not particularly shown) is left covering the entire floor surface portion 344A of the internal surface 348A of the chamber 315A in addition to some or all of the sidewall surface portions of the internal surface 348A as well. Preferably, the internal metallic film layer itself comprises gold, indium, silver, or some other soft metal and has a film thickness within a range of about 4 to 6 mils. Most preferably, however, the internal metallic film layer largely comprises silver due, at least in part, to its desirable solderability and electrical conductivity characteristics.

In addition to obtaining the piezoelectric transducer element 342A and fabricating both the open-topped enclosure 351A and the wallmount bracket 362A, a reverberation resistant anechoic cone 340A is ideally provided as well. The anechoic cone 340A itself is conventionally fabricated such that it particularly has a flat bottom surface and an outward shape, as shown in FIGS. 14 and 15, which is generally circumferentially uniform about its central axis. In addition to such an outward shape, the anechoic cone 340A also includes a threaded hole machine-defined into the top of its outside surface 339A and along its central axis. Once fabricated and provided as such, the outside surface 339A of the anechoic cone 140A is at least partially electroplated in a conventional manner with an outside metallic film layer (not particularly shown) which, at the very least, fully covers its flat bottom surface. When such electroplating is ultimately completed, the outside metallic film layer is ideally left having a film thickness within a range of about 4 to 6 mils. Although various other constituent soft metals such as, for example, gold or indium may be utilized, the outside metallic film layer itself preferably comprises silver due, at least in part, to its desirable solderability and electrical conductivity characteristics.

Once the piezoelectric transducer element 342A, the chamber 315A within the enclosure 351A, and the anechoic cone 340A have all been electroplated as described hereinabove, the surfaces of the element 342A, the chamber 315A, and the anechoic cone 340A are all then cleaned to thereby remove any loose particulates or debris therefrom. After being cleaned, a solder in paste form is then applied over the internal metallic film layer within the chamber 315A in an area that specifically covers only the floor surface portion 344A of the internal surface 348A of the chamber 315A. After the solder paste is applied as such, the piezoelectric transducer element 342A is then lowered into the chamber 315A and gently pressed onto the applied solder paste such that the second metallic film layer 378A electroplated onto the second contact surface 376A of the element 342A particularly rests immediately on top of the paste in a manner that generally centers the element 342A within the chamber 315A. Once the piezoelectric transducer element 342A is centered in this manner, another helping or dollop of the same solder paste is then directly applied onto the first metallic film layer 377A electroplated over the first contact surface 375A of the element 342A. After the solder paste is applied as such, the anechoic cone 340A is then lowered into the chamber 315A and gently pressed onto the second helping of solder paste such that the outside metallic film layer electroplated onto the flat bottom surface portion of the outside surface 339A of the cone 340A particularly rests immediately on top of the paste.

After the anechoic cone 340A, the piezoelectric transducer element 342A, and the two applications of solder paste have all been sandwiched together on top of the floor surface portion 344A of the chamber 315A within the open-topped enclosure 351A, the "sandwich" including the enclosure 351A is then artificially pressed and held together with dead weights and/or spring-loaded means. Once pressed and held together in this fashion, the sandwich including the open-topped enclosure 351A is then placed in an oven to be soldered and thereby fixedly bonded together via an oven reflow process. After being placed in the oven, the sandwich including the open-topped enclosure 351A is then baked for a predetermined period of time of about one hour and at a temperature preferably selected from within a temperature range of about 250 to 450° F. By employing such a low-temperature oven reflow process, a soldering environment with a uniform thermal gradient and a carefully controlled soldering temperature is thereby realized. In this way, the soldering temperature can be closely monitored so as to not exceed the inherent Curie temperature of the piezoelectric transducer element 342A and thereby inadvertently neutralize its piezoelectric properties. Such controlled, low-temperature soldering is generally not possible if, for example, a solder gun were to instead be utilized. Therefore, to carefully avoid the possibility of damaging the piezoelectric transducer element 342A, a low-temperature oven reflow process is very much preferred pursuant to the present invention. Furthermore, to better facilitate the solder-bonding effectiveness of such a low-temperature oven reflow process, the solder paste within the sandwich is preferably a low-temperature type solder such as, for example, an indium alloy type solder including a 50/50 indium/tin (In/Sn) composition. Once the predetermined period of time for baking has expired, the sandwich including the open-topped enclosure 351A is then removed from the oven and allowed to cool in ambient air for a predetermined cool-down time period of preferably two hours or more. After cooling down, the dead weights and/or spring-loaded means are then removed from the sandwich and open-topped enclosure 351A. In this way, a bond layer 343A (i.e., a solder joint) is ultimately formed that serves to conterminously mount and thereby couple the electroplated second contact surface 376A of the piezoelectric transducer element 342A to the electroplated floor surface portion 344A of the chamber 315A. In addition, a bond layer 341A is also ultimately formed that serves to conterminously mount and thereby couple the electroplated flat bottom surface of the anechoic cone 340A to the electroplated first contact surface 375A of the piezoelectric transducer element 342A. To help ensure that the bond layer 343A has desirable adhesion characteristics when later exposed to extreme temperatures in various operating environments, the material composition of the bond layer 343A is preferably designed such that the layer 343A has an overall inherent thermal coefficient of expansion (TCE) that is generally numerically between the inherent TCE of the piezoelectric transducer element 342A and the inherent TCE of the enclosure 351A. Similarly, to help ensure that the bond layer 341A also has such desirable adhesion characteristics, the material composition of the bond layer 341A is preferably designed such that the layer 341A has an overall inherent TCE that is generally numerically between the inherent TCE of the piezoelectric transducer element 342A and the inherent TCE of the anechoic cone 340A.

In addition to both the open-topped enclosure 351A and the wallmount bracket 362A, a removable cover plate 316A is also constructed to thereby complete the primary pieces that are to ultimately make up the housing 313A upon assembly. In general, the cover plate 316A may itself be made of, for example, metal, plastic, or even ceramic material, though metal is generally preferred for electrical grounding purposes. Given such a material composition, the cover plate 316A may therefore be largely fabricated, shaped, and formed via conventional manufacturing processes such as, for example, casting, thermoforming, extrusion, machining, et cetera. When fabrication of the cover plate 316A is completed, the cover plate 316A is thereby preferably shaped such that it evenly matches and thereby substantially covers the open top of the enclosure 351A. In addition, the cover plate 316A is also preferably shaped such that it has a plurality of holes defined therethrough. These holes, in particular, include two threaded screw holes 353A and 355A, two threaded bolt holes 358A and 359A, and a hole 354A for physically accommodating the aforementioned electrical signals conducting means 317A. The two threaded screw holes 353A and 355A, first of all, are sized for tightly accommodating the two threaded screws 326A and 327A. In addition, the two threaded screw holes 353A and 355A are also collinearly aligned respectively with the two threaded screw holes 349A and 350A defined in the upper portion of the enclosure 351A. The two threaded bolt holes 358A and 359A, in turn, are sized for tightly accommodating the two threaded bolts 330A and 331A. In addition, the two threaded bolt holes 358A and 359A are also collinearly aligned respectively with both the two threaded bolt holes 360A and 361A defined in the upper portion of the enclosure 351A and also the two threaded bolt holes 356A and 357A defined in the outer surface 314A of the wallmount bracket 362A. Given such hole alignment, the cover plate 316A can thereby be removably fastened onto the open top of the enclosure 351A with the two threaded screws 326A and 327A and a pair of small annular washers 328A and 329A when assembled as shown in FIGS. 13 and 14. Furthermore, the cover plate 316A along with the enclosure 351A can also be removably fastened onto the wallmount bracket 362A with the two threaded bolts 330A and 331A and a pair of large annular washers 332A and 333A when assembled as shown in FIGS. 13 and 15.

In addition to constructing the removable cover plate 316A, both an electrical connector 325A and a first metallic lug 335A are ideally provided as well. At its first end, the electrical connector 325A is capable of receiving the end of a coaxial cable in a firmly locked fashion. At its opposite second end, the electrical connector 325A and the first metallic lug 335A are fixed together such that the lug 335A is in electrical contact with a center conductor 334A situated along the center axis of the connector 325A. Once the electrical connector 325A and the first metallic lug 335A are properly fixed together as such, the electrical connector 325A itself is installed in a fixed fashion within the hole 354A defined in the removable cover plate 316A. To facilitate airtight sealing of the chamber 315A within the enclosure 351A, a small amount of silicone grease, for example, is preferably applied on the outer sides of the connector 325A just prior to being installed within the hole 354A of the cover plate 316A.

Furthermore, in addition to the above, a second metallic lug 337A, a threaded metal screw 338A, and a long and bare service wire 336A are also ideally provided. The second metallic lug 337A, first of all, is made integral with or fixedly attached onto the top of the metal screw 338A such that the lug 337A and the screw 338A are in electrical contact with each other. The bare service wire 336A, in turn, is preferably constructed from a plurality of electrically conductive strands that are substantially held together via braiding, interweaving, knotting, plaiting, stranding, twisting, tying, or wrapping to thereby render the wire 336A characteristically flexible and substantially able to withstand vibration without breaking. Constructed as such, the first end of the bare service wire 336A is both crimped and soldered onto the first metallic lug 335A. Similarly, the second end of the bare service wire 336A is both crimped and soldered onto the second metallic lug 337A. In this manner, an interconnected and removable cover plate assembly is thereby ultimately formed which includes the removable cover plate 316A, the electrical connector 325A, the first metallic lug 335A, the bare service wire 336A, the second metallic lug 337A, and the threaded metal screw 338A.

Once the removable cover plate assembly has been completely constructed, the chamber 315A and its contents are all then cleaned to thereby remove any loose particulates or debris therefrom. After being cleaned, the threaded metal screw 338A of the cover plate assembly is then screwed and tightly received within the threaded hole defined in the solder-mounted anechoic cone 340A. To prevent the bare service wire 336A from being inadvertently shorted electrically to the internal surface 348A of the chamber 315A during future operation, cotton balls, foam balls, solidifying sponge-type Styrofoam™, or the like (not shown), for example, are preferably packed and stuffed about the wire 336A in a manner that both physically supports and electrically isolates the wire 336A from the internal surface 348A of the chamber 315A. As an alternative, an insulative cylindrical liner (not shown) may instead be slipped down into the chamber 315A such that the liner closely lines and covers the electroplated internal surface 348A of the chamber 315A.

Once the bare service wire 336A has been physically supported and electrically isolated in a proper fashion, a thin layer (not shown) of silicone grease, for example, is preferably applied to the bottom surface 379A of the removable cover plate 316A. After such application, the cover plate 316A is then mounted and tightly screwed to the top of the enclosure 351A with the two threaded screws 326A and 327A along with the two washers 328A and 329A as shown in FIGS. 13 and 14. In this way, airtight sealing of the chamber 315A and its contents within the enclosure 351A is thereby facilitated in order to help prevent the infiltration of contaminants and corrosion.

To establish conterminous coupling between the lower portion of the enclosure 351A and the outer surface 305 of the duct wall 303, the external surface 352A of the lower portion of the enclosure 351A is electroplated with a "wet" metallic film layer 346A just prior to the enclosure 351A being pressed down and mounted within the hole 347A defined through the wallmount bracket 362A. When such electroplating is ultimately completed, the external metallic film layer 346A is ideally left having a film thickness within a range of about 4 to 6 mils. Although various other constituent soft metals such as, for example, silver or indium may be utilized, the external metallic film layer 346A itself preferably comprises gold due, at least in part, to its desirable resistance to corrosion. After the external surface 352A of the lower portion of the enclosure 351A has been electroplated as such, and after the wallmount bracket 362A has been appropriately mounted on the duct wall 303 as in FIGS. 11 and 12, the enclosure 351A is then slipped into the hole 347A within the wallmount bracket 362A and firmly pressed down such that an electroplated bottom surface portion 345A of the enclosure 351A comes into surface-matching contact with the outer surface 305 of the duct wall 303. Upon being situated as such, the enclosure 351A along with the cover plate 316A are then tightly screwed to the wallmount bracket 362A with the two threaded bolts 330A and 331A along with the two washers 332A and 333A as shown in FIGS. 13 and 15. In this way, the external metallic film layer 346A, at the very least, particularly establishes conterminous coupling between the bottom surface portion 345A of the external surface 352A of the enclosure 351A and the outer surface 305 of the duct wall 303 via the hole 347A within the wallmount bracket 362A. As an ultimate result, the overall housing 313A is thereby configured on the outer surface 305 of the duct section 302 such that the housing 313A is at least partially conterminous with the outer surface 305 of the duct section 302 and such that the piezoelectric transducer element 342A is thereby coupled to the outer surface 305 of the duct section 302 in a substantially conterminous fashion.

After both the cover plate 316A and the enclosure 351A have been bolted down onto the wallmount bracket 362A, the free end of a coaxial cable 320A may then be locked onto the top end of the electrical connector 325A as shown in FIGS. 14 and 15. The coaxial cable 320A, in essence, serves as part of the aforementioned electrical signals conducting means 317A. As intimated earlier hereinabove with regard to other embodiments, the electrical signals conducting means 317A primarily serves the role of conducting electrical signals between the electroplated first contact surface 375A of the piezoelectric transducer element 342A and the outside of the housing 313A. In this way, an electric control circuit remotely situated outside of the housing 313A can thereby transmit or receive electrical signals to or from the piezoelectric transducer element 342A for the purpose of determining the temperature of the liquid oxygen passing through the duct section 302. As illustrated in FIGS. 14 and 15, the electrical signals conducting means 317A in this third embodiment primarily includes the coaxial cable 320A, the electrical connector 325A, the first metallic lug 335A, the bare service wire 336A, the second metallic lug 337A, the metal screw 338A, and the anechoic cone 340A. In other practicable embodiments, however, electrical signals conducting means incorporated therein may alternatively include other combinations of various electrically conductive elements or components. For example, the anechoic cone 340A may optionally be altogether omitted and the metallic lug 337A, sans the metal screw 338A, may be oven-soldered directly onto the electroplated first contact surface 375A of the piezoelectric transducer element 342A. In general, in any given embodiment of an electrical signals conducting means, the elements or components included therein, as well as their respective configurations, should ideally render the electrical signals conducting means as being, overall, generally vibration tolerant. To help ensure such vibration tolerance, electrical signals conducting means that largely include soft metals or soft metal solder joints are generally recommended.

Figure 17A:
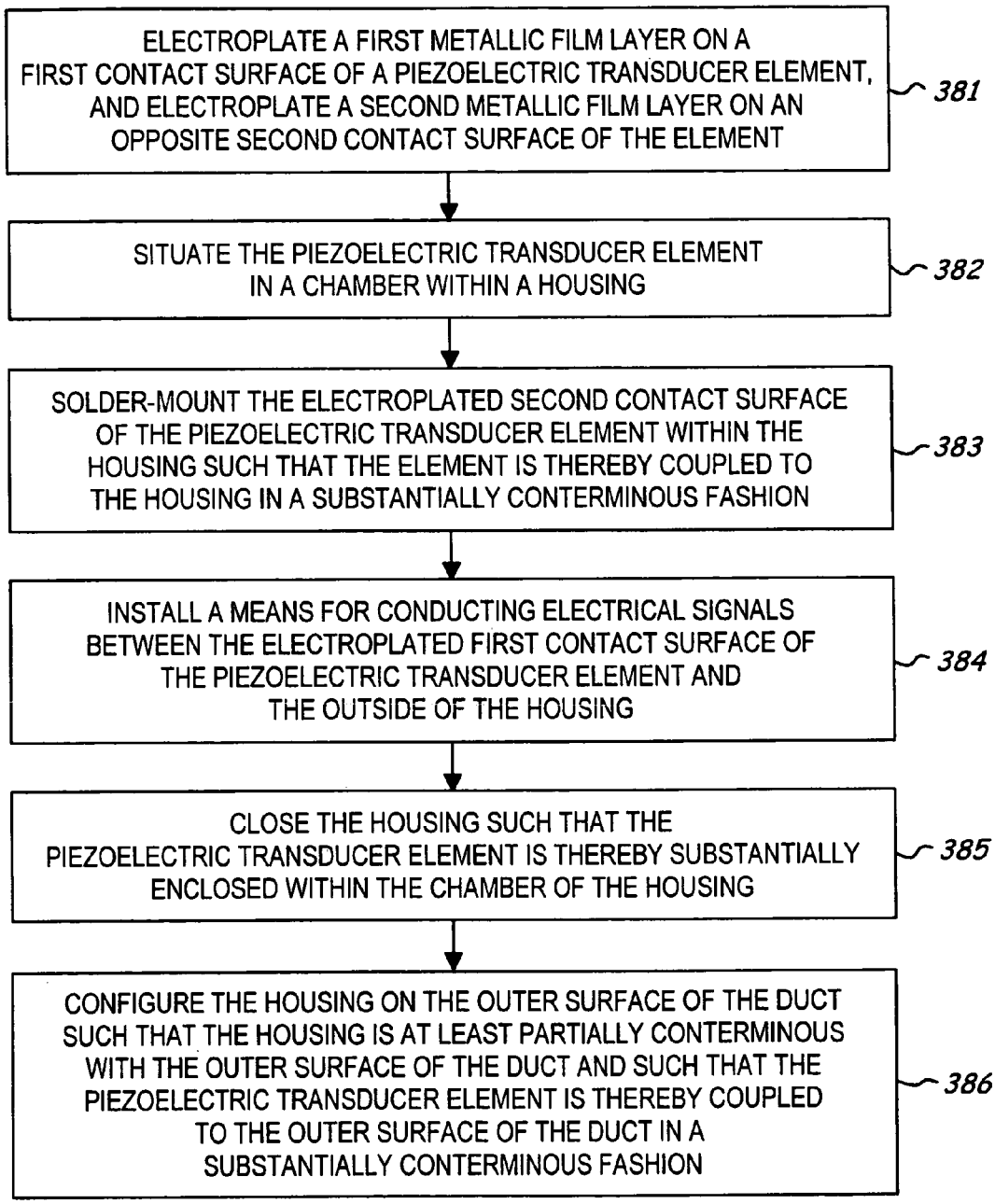
FIG. 17A is a flow chart of a process, in one methodology of the present invention, for fabricating an ultrasonic transducer assembly utile for helping monitor a fluid flowing through a duct.

In FIG. 17A, a flow chart broadly summarizing the above-described process for fabricating the ultrasonic transducer assembly 301A is illustrated therein. As set forth within the flow chart, the fabrication process itself basically includes, first of all, the step 381 of electroplating a first metallic film layer 377A on a first contact surface 375A of a piezoelectric transducer element 342A and electroplating a second metallic film layer 378A on an opposite second contact surface 376A of the piezoelectric transducer element 342A, and the step 382 of situating the piezoelectric transducer element 342A in a chamber 315A within a housing 313A. In addition, the fabrication process also basically includes the step 383 of solder-mounting the electroplated second contact surface 376A of the piezoelectric transducer element 342A within the housing 313A such that the piezoelectric transducer element 342A is thereby coupled to the housing 313A in a substantially conterminous fashion, and the step 384 of installing a means 317A for conducting electrical signals between the electroplated first contact surface 375A of the piezoelectric transducer element 342A and the outside of the housing 313A. Lastly, the fabrication process also basically includes the step 385 of closing the housing 313A such that the piezoelectric transducer element 342A is thereby substantially enclosed within the chamber 315A of the housing 313A, and the step 386 of configuring the housing 313A on the outer surface 305 of the duct 302 such that the housing 313A is at least partially conterminous with the outer surface 305 of the duct 302 and such that the piezoelectric transducer element 342A is thereby coupled to the outer surface 305 of the duct 302 in a substantially conterminous fashion. Although the steps 381 through 386 as set forth in FIG. 17A are presented in a simple sequential fashion, it is to be understood that certain steps or portions of steps may be performed simultaneously or even in a slightly different sequence of order for various different embodiments.

Figure 17B:
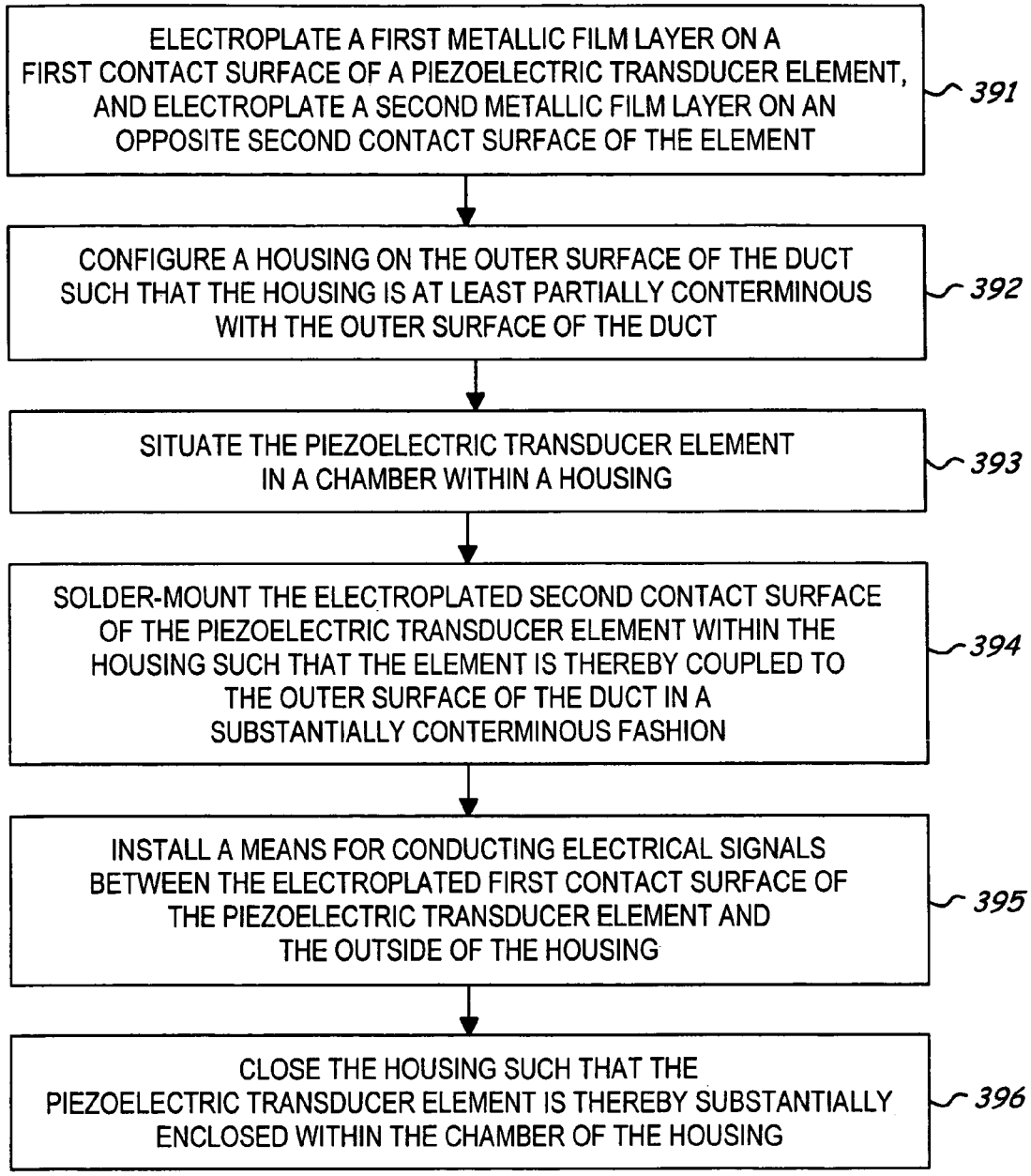
FIG. 17B is a flow chart of an alternative process, in another methodology of the present invention, for fabricating an ultrasonic transducer assembly utile for helping monitor a fluid flowing through a duct.

In general, the process set forth in the flow chart of FIG. 17A may generally be followed for many, if not most, embodiments of ultrasonic transducer assemblies fabricated pursuant to the present invention. For example, in addition to the ultrasonic transducer assembly 301A in FIGS. 11 through 15, the same general fabrication process may also be utilized to construct the ultrasonic transducer assembly 101A1 of FIGS. 4 and 6 as well as the ultrasonic transducer assembly 201A of FIGS. 10A and 10B. For the ultrasonic transducer assembly 101A2 of FIGS. 8 and 9, however, a slightly different fabrication process including the steps 391 through 396 as set forth in the flow chart of FIG. 17B is a little better suited therefor.

In summary, in implementing one or more of the above-described preferred embodiments or methodologies pursuant to the present invention, a piezoelectric transducer element is thereby coupled to the outer surface of a duct in a substantially conterminous fashion such that any element-to-housing or housing-to-duct coupling medium or solder joint is particularly able to largely endure cryogenic temperatures and withstand extreme vibration without experiencing significant micro-cracking, fracture, or delamination. This ability to tolerate such extreme conditions is largely due to the soft, ductile, or malleable metals (i.e., gold, indium, silver, et cetera) that are particularly incorporated within any such element-to-housing or housing-to-duct coupling medium or solder joint pursuant to the present invention. In particular, such soft metals cooperatively allow for a certain degree of lateral or tangential movement when a piezoelectric transducer element experiences extreme vibration. At the same time, such soft metals also compensate and allow for thermal expansion and shrinkage of coupled or soldered surfaces under extreme and everchanging temperatures without compromising good contact adhesion between such surfaces. As an ultimate result of incorporating such soft metals, ultrasonic acoustic signals transmitted or received by a piezoelectric transducer element incorporated within an ultrasonic transducer assembly pursuant to the present invention are therefore not unduly interfered with. Hence, an ultrasonic transducer assembly in a preferred embodiment, or fabricated according to a preferred methodology, pursuant to the present invention can therefore be effectively utilized in liquid-propellant type rocket engine propulsion applications as well as, for example, aircraft engine fuel measurement applications, rotorcraft engine fuel measurement applications, and the like.

Furthermore, it is believed that various alternative embodiments, methodologies, design considerations, and applications of the present invention will become apparent to those skilled in the art as well. For example, instead of utilizing gold, indium, or silver, other soft metals such as aluminum, copper, tin, and the like may alternatively be included within metallic film layers and/or solder joints incorporated within ultrasonic transducer assemblies according to the present invention. In addition, alternative metallic film thicknesses, soldering temperatures, solder times, cooling off times, et cetera may be utilized as well depending on desired ultrasonic transducer assembly design and performance goals. Lastly, ultrasonic transducer assemblies pursuant to the present invention may alternatively be utilized to monitor the flow of fluids other than liquid oxygen. Such other fluids may include, for example, liquid helium, liquid hydrogen, liquid nitrogen, et cetera.

While the present invention has been described in what are presently considered to be its most practical and preferred embodiments or implementations, it is to be understood that the invention is not to be limited to the disclosed embodiments. On the contrary, the present invention is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An ultrasonic transducer assembly for helping monitor a fluid flowing through a duct, said ultrasonic transducer assembly comprising:
   a piezoelectric transducer element having a first contact surface electroplated with a first metallic film layer and an opposite second contact surface electroplated with a second metallic film layer;
   a housing, configured on and at least partially conterminous with the outer surface of said duct, having a chamber in which said piezoelectric transducer element is situated and thereby substantially enclosed; and
   means for conducting electrical signals between said electroplated first contact surface of said piezoelectric transducer element and the outside of said housing;
   wherein said electroplated second contact surface of said piezoelectric transducer element is solder-mounted within said housing such that said piezoelectric transducer element is thereby coupled to said outer surface of said duct in a substantially conterminous fashion.

2. An ultrasonic transducer assembly according to claim 1, wherein said ultrasonic transducer assembly is utile for helping monitor the temperature and the flow rate of said fluid flowing through said duct.

3. An ultrasonic transducer assembly according to claim 1, wherein said fluid is a constituent for a propellant mixture.

4. An ultrasonic transducer assembly according to claim 1, wherein said fluid is selected from the group consisting of liquid oxygen and liquid hydrogen.

5. An ultrasonic transducer assembly according to claim 1, wherein said duct comprises metal.

6. An ultrasonic transducer assembly according to claim 1, wherein said duct is physically associated with a thrusting engine onboard a rocket.

7. An ultrasonic transducer assembly according to claim 1, wherein said piezoelectric transducer element is a ceramic crystal wafer.

8. An ultrasonic transducer assembly according to claim 7, wherein said ceramic crystal wafer has a lead zirconate titanate composition.

9. An ultrasonic transducer assembly according to claim 1, wherein each of said first metallic film layer and said second metallic film layer of said piezoelectric transducer element comprises at least one metal selected from the group consisting of gold, indium, and silver.

10. An ultrasonic transducer assembly according to claim 1, wherein each of said first metallic film layer and said second metallic film layer of said piezoelectric transducer element has a thickness selected from within a range of about 4 mils to 6 mils.

11. An ultrasonic transducer assembly according to claim 1, wherein said housing comprises a plurality of pieces attached together and collectively situated on said outer surface of said duct.

12. An ultrasonic transducer assembly according to claim 11, wherein at least one of said pieces of said housing comprises a constituent material selected from the group consisting of a ceramic, a metal, and a plastic.

13. An ultrasonic transducer assembly according to claim 11, wherein one of said pieces of said housing is a removable cover plate for providing open access to said chamber within said housing.

14. An ultrasonic transducer assembly according to claim 13, wherein said removable cover plate has a hole defined therethrough for physically accommodating said electrical signals conducting means.

15. An ultrasonic transducer assembly according to claim 11, wherein at least one of said pieces of said housing has an external surface at least partially electroplated with an external metallic film layer, and at least part of said electroplated external surface is coupled to said outer surface of said duct in a substantially conterminous fashion such that said piezoelectric transducer element is thereby coupled to said outer surface of said duct in a substantially conterminous fashion.

16. An ultrasonic transducer assembly according to claim 15, wherein said external metallic film layer comprises at least one metal selected from the group consisting of gold, indium, and silver.

17. An ultrasonic transducer assembly according to claim 15, wherein said external metallic film layer has a thickness selected from within a range of about 4 mils to 6 mils.

18. An ultrasonic transducer assembly according to claim 11, wherein at least one of said pieces of said housing is integral with said outer surface of said duct.

19. An ultrasonic transducer assembly according to claim 1, wherein said housing has an internal surface lining said chamber and at least partially electroplated with an internal metallic film layer.

20. An ultrasonic transducer assembly according to claim 19, wherein said internal metallic film layer of said housing comprises at least one metal selected from the group consisting of gold, indium, and silver.

21. An ultrasonic transducer assembly according to claim 19, wherein said internal metallic film layer of said housing has a thickness selected from within a range of about 4 mils to 6 mils.

22. An ultrasonic transducer assembly according to claim 1, wherein said electrical signals conducting means comprises an interconnected plurality of electrically conductive elements in which at least one of said electrically conductive elements is selected from the group consisting of an anechoic cone, a coaxial cable, an electrical connector, a metallic lug, and a wire.

23. An ultrasonic transducer assembly according to claim 22, wherein said anechoic cone has an outside surface at least partially electroplated with an outside metallic film layer, and said electroplated outside surface of said anechoic cone is solder-mounted on said electroplated first contact surface of said piezoelectric transducer element.

24. An ultrasonic transducer assembly according to claim 23, wherein said outside metallic film layer of said anechoic cone comprises at least one metal selected from the group consisting of gold, indium, and silver.

25. An ultrasonic transducer assembly according to claim 23, wherein said outside metallic film layer of said anechoic cone has a thickness selected from within a range of about 4 mils to 6 mils.

26. An ultrasonic transducer assembly according to claim 23, wherein said piezoelectric transducer element has an inherently associated Curie temperature, and said electroplated outside surface of said anechoic cone is solder-mounted on said electroplated first contact surface of said piezoelectric transducer element with a solder comprising an indium alloy and at a soldering temperature less than said Curie temperature.

27. An ultrasonic transducer assembly according to claim 22, wherein said wire comprises a plurality of electrically conductive strands that are substantially held together via a means selected from the group consisting of braiding, interweaving, knotting, plaiting, stranding, twisting, tying, and wrapping to thereby render said wire characteristically flexible and substantially able to withstand vibration.

28. An ultrasonic transducer assembly according to claim 1, wherein said piezoelectric transducer element has an inherently associated Curie temperature, and said electroplated second contact surface of said piezoelectric transducer element is solder-mounted within said housing with a solder comprising an indium alloy and at a soldering temperature less than said Curie temperature.

29. An ultrasonic transducer assembly for helping monitor a fluid flowing through a duct, said ultrasonic transducer assembly comprising:

a piezoelectric transducer element having a first contact surface electroplated with a first metallic film layer, an opposite second contact surface electroplated with a second metallic film layer, and an inherently associated Curie temperature;

a housing, configured on and at least partially conterminous with the outer surface of said duct, having a chamber in which said piezoelectric transducer element is situated and thereby substantially enclosed; and means for conducting electrical signals between said electroplated first contact surface of said piezoelectric transducer element and the outside of said housing; wherein each of said first metallic film layer and said second metallic film layer of said piezoelectric transducer element comprises at least one metal selected from the group consisting of gold, indium, and silver; and wherein said electroplated second contact surface of said piezoelectric transducer element is solder-mounted within said housing with a solder comprising an indium alloy, at a soldering temperature less than said Curie temperature, and such that said piezoelectric transducer element is thereby coupled to said outer surface of said duct in a substantially conterminous fashion.

* * * * *